United States Patent
DeMedio

(10) Patent No.: US 6,506,056 B1
(45) Date of Patent: Jan. 14, 2003

(54) EVENT PLANNER WITH VISUAL SEATING CHART ORGANIZER

(76) Inventor: David M. DeMedio, 897 S. York Dr., Downingtown, PA (US) 19335

( * ) Notice: Subject to any disclaimer, the term of this patent is extended or adjusted under 35 U.S.C. 154(b) by 0 days.

(21) Appl. No.: 09/179,025

(22) Filed: Oct. 26, 1998

(51) Int. Cl.[7] ............................................... G09B 25/00

(52) U.S. Cl. ......................................... 434/72; 446/482

(58) Field of Search .............................. 434/72, 73, 75, 434/76, 79, 80; 446/479, 482, 92

(56) References Cited

U.S. PATENT DOCUMENTS

| | | | | |
|---|---|---|---|---|
| 1,988,461 A | * | 1/1935 | Reeves | |
| 2,127,047 A | * | 8/1938 | Pinney | |
| 2,405,808 A | * | 8/1946 | Armbright | |
| 2,528,211 A | * | 10/1950 | Civkin | |
| 2,814,909 A | * | 12/1957 | Knowles | 446/135 |
| 3,269,034 A | * | 8/1966 | Glass | |
| 3,577,672 A | * | 5/1971 | Nutting | 446/85 |
| 3,603,004 A | * | 9/1971 | Fink | |
| 4,017,986 A | * | 4/1977 | Miller | |
| 4,135,315 A | * | 1/1979 | McKee | |
| 4,233,778 A | * | 11/1980 | Lemelson | 40/426 |
| 4,626,218 A | * | 12/1986 | Wright | 434/73 |
| 4,652,239 A | * | 3/1987 | Brimberg | |
| 5,975,908 A | * | 11/1999 | Hulten | 434/72 |

* cited by examiner

Primary Examiner—Jacob K. Ackun
Assistant Examiner—Bena B. Miller

(57) ABSTRACT

A room floor plan and visual seating chart organizer. Room floor planning involves arranging type, size and position of room fixtures, such as table, stages, podiums, lighting, dance floors, music/disc jockey area, doors, emergency exits, room walls, and general room artifacts. Seating chart planning involves arranging, and organizing seating preferences including place settings and preferences for guests, special needs guests, and key event people such as brides and grooms. Additionally, room floor plans and room fixtures, such as tables can be resized and scaled to a ratio, proportional to the actual event room fixtures and room dimensions. Further, once arranged and positioned room fixtures and person characterizations, such as key people, guest and special needs guests can be fastened to the room fixtures. A plurality of similar and or different strength or types of adhesives or fastens can be utilized. Further, the final form of an event that has been planned can be easily duplicated for distribution by means of traditional photocopiers or by means of personal computer (PC) generation. Further, the present invention is well suit for assemble and packaging in kit form. Different kits can be tailored for different types of events and for varying number of guests. Further, PC software can aid in the generating and printing of room fixtures and person characterization and can be utilized to produce a complete computer event-plan including the room floor plan, room fixtures, place settings and event seating chart.

16 Claims, 18 Drawing Sheets

500

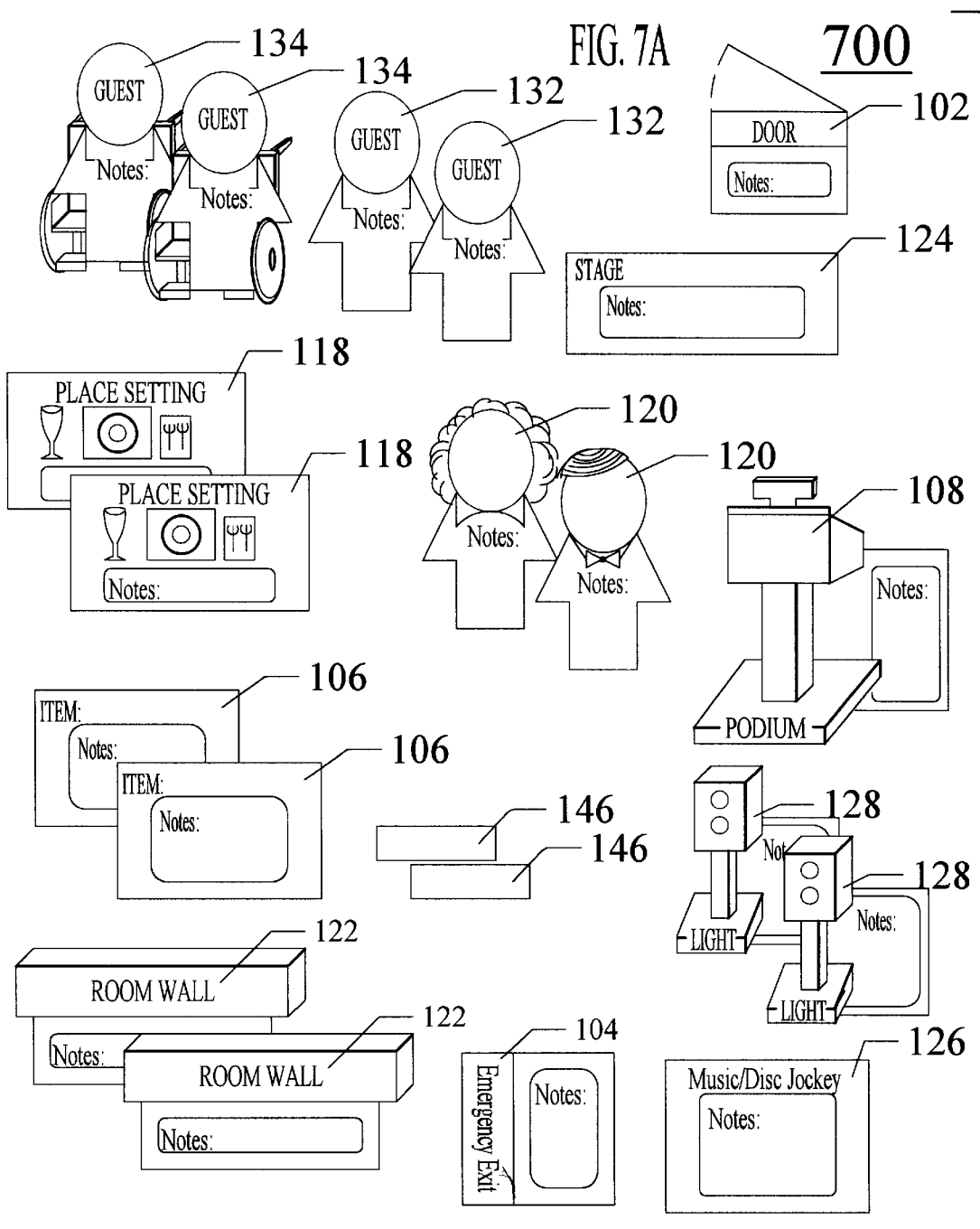

700

800

EVENT PLANNER WITH VISUAL SEATING CHART ORGANIZER

TECHNICAL FIELD OF THE INVENTION

The present invention relates to an event-planning organizer utilizing paper, plastic, polymer, and or computer-generated and printed objects to create scaleable and resizable representations of actual room fixtures, and person characterizations. Events can include weddings, wedding receptions, parties, or business related functions. Event planning can involve the arrangement and orientation of room fixtures, such as furniture, lighting, doorways, stages, podiums, tables, and other room artifacts. Event planning can also include the organization and arrangement of guests or attendees, generally referred to as an event seating chart, or event seating preferences. More specifically, the present invention relates to a convenient, fast, and reliable system and method to plan an event including room fixture placement, and guest seating preferences.

BACKGROUND OF THE INVENTION

Organizing an event such as a wedding, wedding reception, party, or business meeting can be difficult to an event organizer unfamiliar with the detailed steps associated with event planning. There can be many factors to consider including, procurement of a suitable event location, event room size considerations, and food catering requirements. In addition, event organizers may have to include special accommodations for handicapped guests (special needs guests), make provisions for guest seating preferences, and insuring convenient and clear access to food and other event location facilities.

Event organizers may be responsible for insuring room layouts, room fixtures and furniture organization do not violate maximum room occupancy laws and or applicable fire code rules, regulations, and or laws. These fire code and law violations can occur when furniture and other room fixtures are too numerous with respect to room size or positioned inappropriately—blocking fire exits or safety equipment. In addition inappropriate placement of open flames, such as candles and food warmers can cause fire hazards.

Too many tables or tables poorly organized within a room can cause other problems including the appearance that the event was poorly attended. In addition, undue separation of guests can prevent easy conversation and discourage guest mingling. Additionally, poor room layout can unduly impede the guest's ability to move from table to table, access key event areas, and easily enter or exit a room safely.

Planning the layout of a room for an event can include other factors such as insuring each person seated at a table has a clear view of a stage or activity focal area. In general activity focal areas can include a head or main table, a speaking podium, stage, dance floor, or music/disc jockey area. It may also be necessary to allow enough room for each guest to reposition chairs to view a stage, move to an unobstructed view of an activity focal area, or stand without interference of nearby tables.

Selection of furniture can influence the layout of a room. Tables of different geometry (round, oval, square, and rectangle) occupy different amounts of floor space and offer different advantages and disadvantages in guest seating options. Correspondingly, different size and shaped tables accommodate a varying amount of place settings—as well as effectuate different, levels of guest interaction. A place setting being a space where guests and event attendees can eat and drink either individually or in a group. Further, counting place settings to insure each guest has a place to sit, eat and or drink can be difficult when the furniture varies in size and shape or if table geometry makes it difficult to estimate how many guests can be comfortably seated at a table. With numerous factors affecting room layout and table seating capacity determining the number of tables and most effective room layout can be difficult.

Event location owners or facilities managers can make available or otherwise provide certain types of furniture leaving only the room layout to be determined by the event organizer. Other location owners or facility managers may only provide access to the room, leaving the selection and procurement of room fixtures, including tables, the responsibility of the event organizer. In many cases the room fixtures required and how to best organize and utilize the room fixtures, and or utilize room space in a room layout can be left in part or in whole to the event organizer.

Current methods for arranging tables for an event can include physically going to a location and attempting to visualize mentally how a room completely setup and organized might appear. Other methods can include drawing a representation on paper and rough-drafting potential suitable room layouts. Yet other methods can include last minute organization the day of the event to push furniture around a room to try arrive at an acceptable arrangement. The foregoing table arrangement methods can be difficult to implement, plan in advance, copy for distribution, and awkward to manage changes. Changes and revisions can require extensive erasing and redrawing—significantly impacting the amount of time required to derive a preferred table arrangement or room layout scheme.

At many special events guest seating can be one of the most important and time-consuming steps in planning the room layout. For example, event planners at weddings may desire to seat the bride and groom at a head or main table in the front of the room, and then place members of the wedding party (best man, maid of honor, etc.) in close proximity to the bride and groom. Guests at the wedding can be divided into small groups and organized to occupy the general population of tables and place settings. The arrangement of whom sits where, and next to who can be a difficult and time consuming task, requiring numerous revisions and involving the input and consideration of two or more families, event planners and a host of other interested parties.

While organizing a seating preference chart event organizers may discover the table arrangement is inappropriate for one reason or another. Table count, arrangement, and geometry may need to be changed to perfect a preferred room layout and event-seating chart to meet individual preferences, and comply with applicable laws. Perfecting a room layout with seating chart can involve a significant amount of time, require numerous revisions, and extensive trial placement iteration.

Current methods of creating seating charts for an event can include the creation and manipulation of a list of guests written on a piece of paper. Other methods can include employing a number sequence and attempting to assign numbers to guests, and guests to tables. Yet other methods can include drawing a rough draft of the room and applying guest names to the rough draft of the room layout. The foregoing seating chart arrangement methods can be difficult to implement, plan in advance, copy for distribution, and awkward to manage changes. Further, lists of names are difficult to visualize where each person will be located making optimizing a seating chart difficult. Changes and revisions can require extensive erasing and redrawing—significantly impacting the amount of time required to derive a preferred seating chart.

In addition, current aforementioned methods for generating an event room layout (room fixture arrangement, and seating chart or seating preference chart) may not offer easy or flexible ways to resize and scale room fixtures in proportion to room size and actual room objects. For example the ability to scale a round table to be six feet in diameter with respect to the size of the event room is an important factor in determining how many six foot tables can comfortably fit in the event room. Further, the ability to quickly resize a six-foot diameter table to an eight-foot diameter table, with respect to room size can allow event organizers to rapidly decide which table size is better and how changes in table size impact seating capacity and guest seating preferences.

A combination of reasons give rise to the present invention including a need for a fast and reliably way to plan an event room layout. The ability to accommodate different shapes and sizes of rooms, and room fixtures (i.e. furniture, lighting, doors, etc.) can be critical factors in perfecting a preferred room layout and complying with applicable laws. In addition, the ability to scale and resize room fixtures to be in a ratio proportional to the room size and actual room objects would allow event organizers to more accurately derive a suitable preferred room layout plan in a minimal amount of time. Further, the ability to select and move room fixtures, such as tables, and guest seating assignments offers a fast and efficient way to optimize room setup and manage event attendee seating preferences.

In addition, when a room layout is complete the ability to make accurate clear copies for distribution to other event organizers can aid in resolving possible points of confusion or conflict. Points of confusion or conflict can include accurate placement of room fixtures in the event room, and accurate guest name card placement (proper seating assignments).

SUMMARY OF THE INVENTION

The present invention relates to an event-planning system, and method for planning an event room floor plan, determining place setting arrangements, and deriving preferred event attendee seating preferences. Room floor plan planning involves arranging type, size and position of room fixtures, such as table, stages, podiums, lighting, dance floors, music/disc jockey area, doors, emergency exits, room walls, and general room artifacts within an event room. Seating chart, or seating preference planning involves arranging, and organizing attendee seating including place settings and preferences for general guests, guests with special needs, and for key event people such as a bride and groom. Additionally, room floor plans and room fixtures, such as tables can be resized and scaled to a ratio proportional to the actual event room fixture and or room dimensions. Further, once arranged and positioned room fixtures and person characterizations, such as key people, guest and special needs guests can be fastened to the room floor plan. Fastening means can include magnets, glues, and adhesive strips. In certain embodiments a plurality of similar and or different strength, or types of adhesives, or fasteners can be utilized as fastening means. Further, the final form of an event that has been planned by the present invention can be easily duplicated for distribution by means of traditional photocopiers or by means of personal computer (PC) generation. PC generation is generally referred to as computer aided design (CAD). Further, the present invention is well suit for assembly and packaging in kit form. Different kits can be tailored for different types of events and for varying number of guests. Further PC software can be utilized for the generation and printing of room floor plans, room fixtures and person characterizations. Further, PC software can be utilized to produce a complete computer event-plan including the room floor plan, room fixtures, place settings and event-seating chart.

BRIEF DESCRIPTION OF FIGURES

FIGS. 7A and 7B shows a representation of an event planning kit 700.

DESCRIPTION OF THE INVENTION

An event is defined as a gathering of one or more persons for a specific purpose. Weddings, wedding rehearsals and receptions, parties, and business functions are events. Further, an event location includes gatherings in room, hall, hotel, church facility, a kitchen, or other room in a house, business, or other structure or dwelling. For purposes of disclosure, an entire floor of a house, floor of a building, floor of a business, floor in a structure or floor in a dwelling is considered to be a room, and is generally referred to as a room. For purpose of disclosure, an entire house, an entire building, an entire structure or an entire dwelling is considered to be a room, and generally referred to as a room. Further, an outdoor setting such as a backyard, fenced in area, or other defined outdoor area is considered to be a room.

The planning of an event includes the selection and organization of furniture, amenities, and other objects for placement in an event room. Furniture, amenities, and other objects are generally referred to as room fixtures, or fixtures, or room objects, or objects. Further, event planning includes the selection and organization of person characterizations in the form of a seating chart or seating preferences, or seating arrangement for event attendees. In addition, and as required by the nature of the event, event planning includes the organization of place settings for purposes of serving food and drink to the event attendees.

Figure 1:
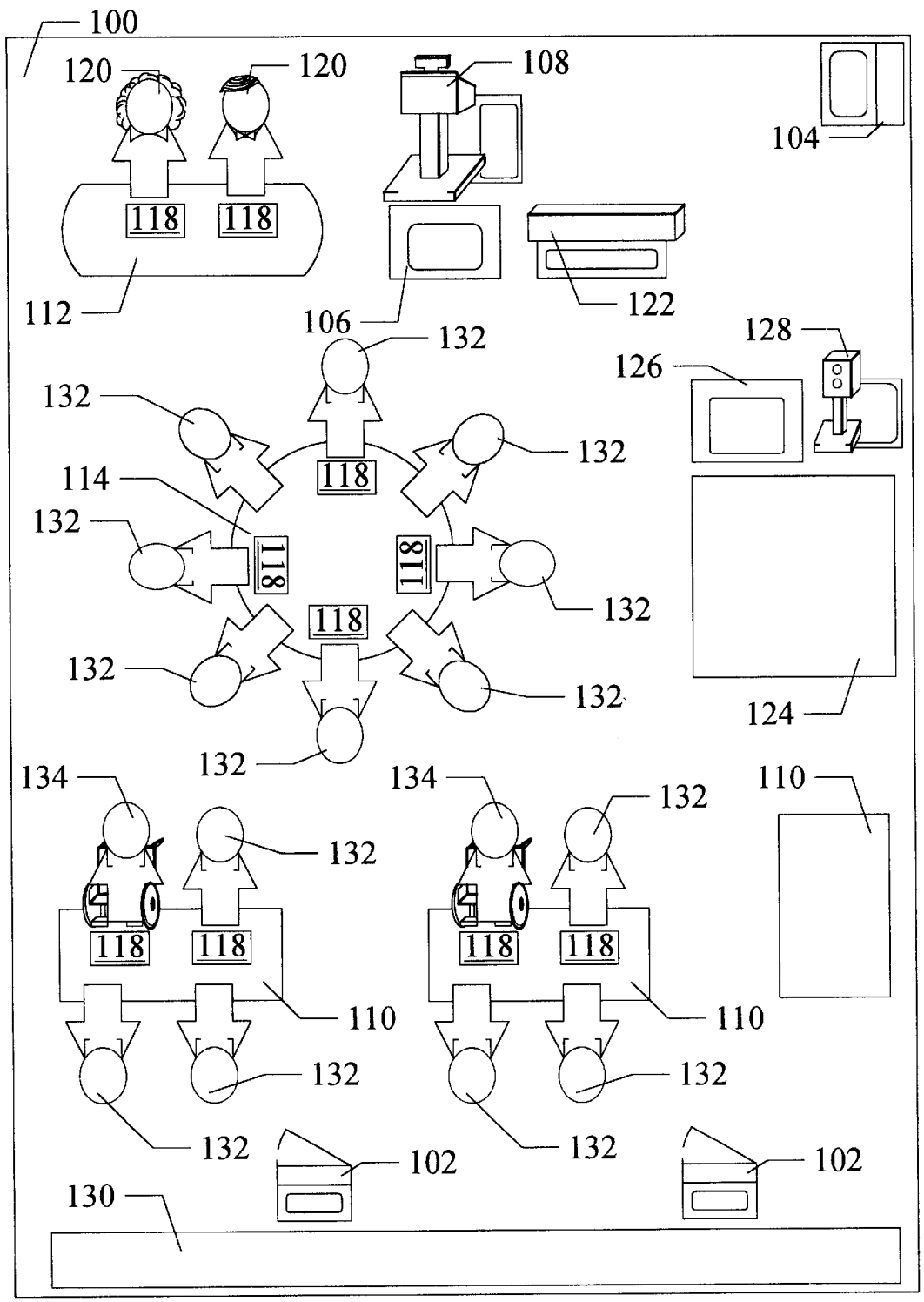
FIG. 1 shows a room layout.

There is shown in FIG. 1 a room layout. Positioned on, fastened to and interconnected with a room floor plan 100 are a plurality of doors 102, an emergency exit 104, a general room artifact 106, a podium 108, and a plurality of four-sided shape tables 110. Additionally, positioned on, fastened to and interconnected with the room floor plan 100 is an oval shape table 112, a round shape table 114, a dance floor 116, a plurality of place settings 118, and a plurality of key people 120. Further, positioned on, fastened to and interconnected with a room floor plan 100 is a wall 122, a light 128, a note pad 130, and plurality of guests 132, a plurality of special needs guests 134, and a music/disc jockey area 126. A notepad 130 can be a room floor plan 100.

In an exemplary embodiment a variety of room fixtures are selected from a group of related and unrelated room fixtures. Each fixture can be placed on and or fastened to the room floor plan 100. A variety of room fixtures can include door 102, emergency exit 104, general room artifact 106, podium 108, four-sided shape table 110, oval shape table 112, round shape table 114, dance floor 116, room walls 122, stage 124, disc-jockey area 126, and lighting 128.

A variety of key people, guests, and special needs guests, generally referred to as person characterizations, or referred to as a person, or referred to as people can be selected from a group of related and unrelated person characterizations. Each person characterization can be placed on and or fastened to the room floor plan 100.

Each person characterization object can be organized individually or by group around tables, and other room fixtures. A variety of person characterizations can include key people 120, guests 132, and special needs people 134. Further a place setting 118 can be placed or fastened in association with various room fixtures and or person characterizations to represent a place where a guest can eat and or drink.

Each object (room floor plan, room fixture and person characterizations) has an area where notes and other information can be printed, written or otherwise recorded. Such notes can include guest names, guest preferences, room setup instructions, or table specifications. The user can summarize event-planning activities in a notepad 130 area.

Referring to FIGS. 2A–2J there is shown various room fixtures. A room fixture is generally defined as any item that can be placed in the interior of the event room. Room fixtures can be furniture, doors, decorations, lighting, and other functional aspects of a room including telecommunication, computer, sound equipment, and other electrical or technical resources. A room fixture can also be generally referred to as a room object or object. Key people 120, guests 132, and special needs guests 134 can be generally referred to as person characterizations. Person characterizations for purpose of disclosure are generally defined as room fixtures.

Certain room fixtures, such as room floor plan 100, four-sided shape table 110, oval shape table 112, and round shape table 114 are scaleable and resizable. The term scalable is generally defined as the ability to resize a room fixture to be in a ratio proportional to room size and or proportional to an actual room fixture. Room fixtures that are scaleable can be inscribed with a legend, ruler, notch marks or other numeric markings to correlate room fixture scale size to a known actual room fixture size. For example, a four-sided shape table 110 can be resized using an inscribed ruler and numeric markings to represent the proportional size of an eight-foot, actual four-sided shape table. Scaling the room fixtures allow a user to more accurately arrange groups of fixtures in the same room floor plan 100—in a ratio proportional to their real world counterpart room fixture.

The term resizable, is generally define as the ability to change a room fixtures appearance by increasing or decreasing the room fixtures overall length and or width or other dimension. Resizing in combination with scaling aforementioned allows a user to proportion the size of the event planning room fixtures to the actual size of the real world room fixtures being represented.

In an exemplary embodiment room fixtures including person characterizations can be cut or punched from paper, and or fabricated out of a durable-flexible plastic or other polymer. A large variety of readily available similar or related materials can also be utilized.

In an exemplary embodiment, when original placement of room fixtures is complete the room plan, and particularly the seating arrangement can be optimized. A complete plan not only produces a list of event attendees but also produces a visual representation of where each guest is physically located in the room. Unlike seating list methods, the advantage of visually seeing where each key people, guest, and special needs guest is located in the room with respect to the room fixtures insure guest preferences are met. For example, visually seeing the grandparent's table has been positioned to close to the dance floor might prompt the event planner to relocate that table to a different part of the room, further away from the loud noise and commotion of a dance floor. Further, visually noting that a special needs guest (using a wheel chair) has been inadvertently located in the center of the room isolated from access to doors, and surrounded by room fixtures including tables could easily be relocated to a different table. The visual advantage of being able to reposition and relocate individual guests and groups of guests such as an entire table allows seating preferences to be optimized fast and efficiently.

In another exemplary embodiment a user can choose to only plan a visual seating chart. In planning a visual seating chart the user can use a plurality of room fixtures, such as four side shape table 110, oval shape table 112, and round shape table 114 in combination with person characterizations such as key people 120, guest 132, and special needs guest 134. Customizing each person characterization and placing them on the table allows the user (event planner) a visual seating chart. Additionally, locating individual person characterization among a plurality of person characterizations is easily facilitated because each person characterization can be individually customized (i.e. with the key people, guest, special needs guest name). Further, with the aid of a visual seating chart seating conflicts, and individual seating preference violations can be visually spotted and individual person characterizations, or an entire table can be relocated to resolve the conflict or violation.

Figure 2A:
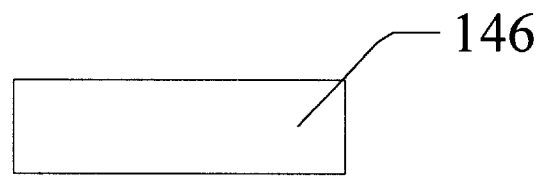
FIG. 2A shows an adhesive strip.

There is shown in FIG. 2A an adhesive strip 146. An adhesive strip 146 can be added to room fixtures, including person characterization to secure or fasten such items to a room floor plan 100. Adhesive strips, such as adhesive strip 146 can include single or double stick (or double sided) tape, glue, or magnets. In an exemplary embodiment one or more adhesive strips can be provided for each room fixture, including person characterizations, and room floor plan 100. When one strip of adhesive is utilized the strength of the adhesive can be selected to allow easy movement and relocation of room fixtures and person characterizations on room floor plan 100 with minimal damage occurring to room fixtures, person characterizations, or room floor plan 100. Further, when one strip of adhesive is utilized the adhesive strength of the adhesive can be selected to prevent room fixtures and person characterizations from easily becoming dislodged from room floor plan 100.

When more than one strip of adhesive is utilized a first strip can be low to light adhesive strength as described in the aforementioned one strip embodiment. An additional or second strip can be of a more semi-permanent adhesive strength to firmly secure room fixtures to room floor plan 100, when an event plan has been finalized.

Adhesive strips as described can be cut from sheets of adhesive available from the 3M company. Specifically, 3M adhesive part number #9172 can be utilized to implement an adhesive strip 146. Numerous similar 3M brand products, GENERAL ELECTRIC (GE) brand products and other brands of adhesive products can be substituted.

Fastening means include adhesive strips 146, glue, adhesives, tape single side and double stick (double sided), and magnets to fasten room fixtures to the room floor plan 100. Further, glue, adhesives, and magnets can be utilized individually or in combination. An adhesive strip 146 can be glue, adhesives, tape single side and double stick (double sided), and magnets.

Figure 2B:
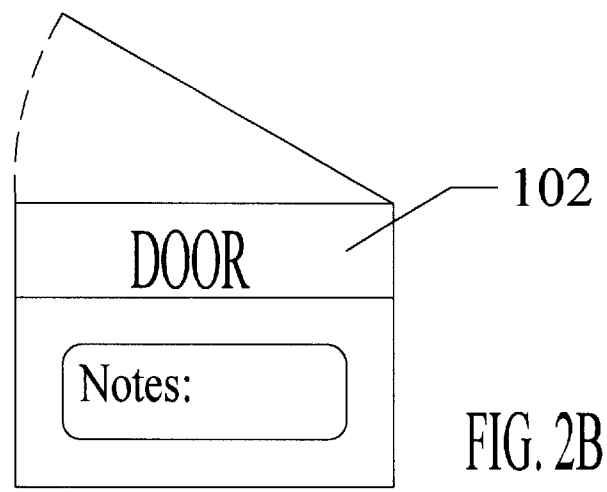
FIGS. 2B–2J show various representations of room fixtures.

There is shown in FIG. 2B a room fixture representation of a door 102. The door 102 includes a note area where a user can add descriptive text, notes and other graphics to the door 102. Further, the door 102 can be fastened with a fastening means, such as a plurality of adhesive strips 146 to a room floor plan 100, or other room fixture, or person characterization.

Figure 2C:
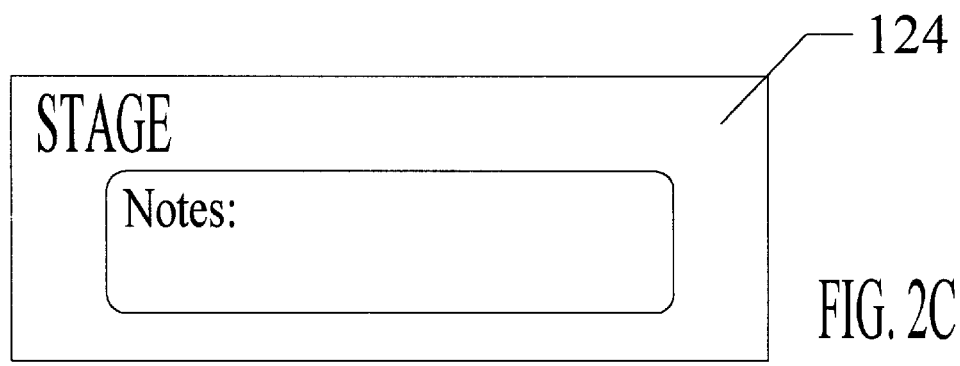

There is shown in FIG. 2C a room fixture representation of a stage 124. The stage 124 includes a note area where a user can add descriptive text notes and other graphics to the stage 124. Further, the stage 124 can be fastened with a fastening means, such as a plurality of adhesive strips 146 to a room floor plan 100, or other room fixture, or person characterization.

Figure 2D:
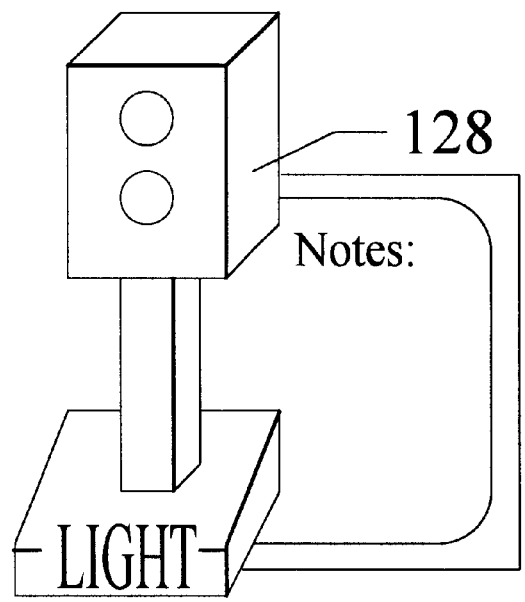

There is shown in FIG. 2D a room fixture representation of a light 128. The light 128 includes a note area where a user can add descriptive text, notes and other graphics to the light 128. Further, the light 128 can a plurality of adhesive strips 146, which can be used to fasten the light 128 to a room floor plan 100 or other room fixture or person characterization.

Figure 2E:
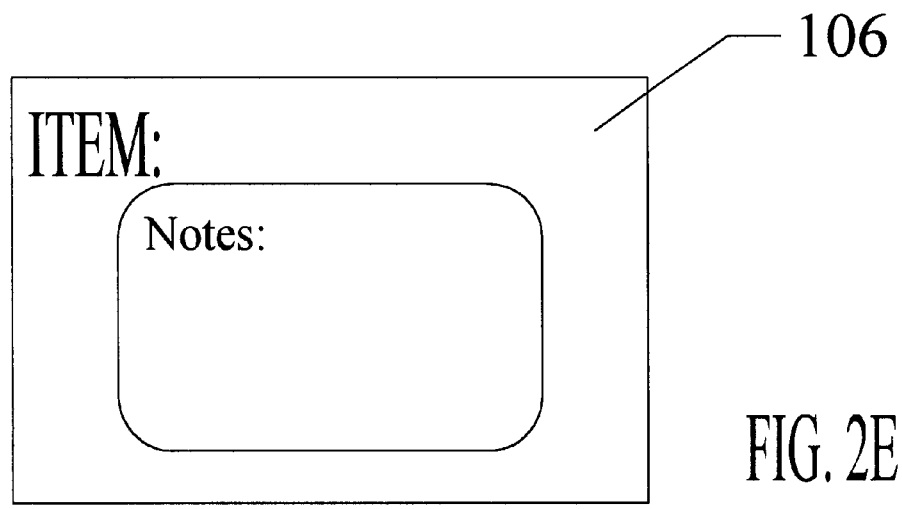

There is shown in FIG. 2E a room fixture representation of a general room artifact 106. The general room artifact 106 includes a note area where a user can add descriptive text, notes and other graphics to the general room artifact 106. Further, the general room artifact 106 can be fastened with a fastening means, such as a plurality of adhesive strips 146 to a room floor plan 100, or other room fixture, or person characterization.

Figure 2F:
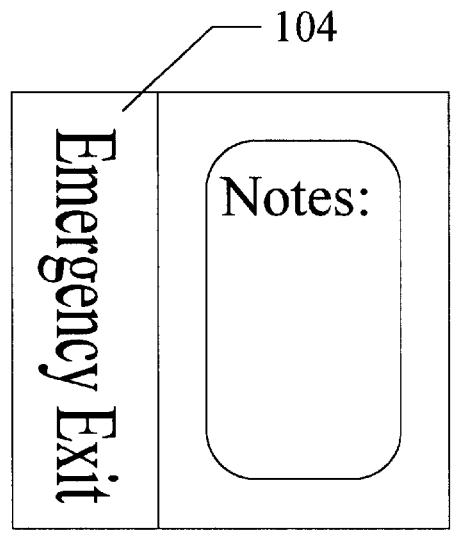

There is shown in FIG. 2F a room fixture representation of an emergency exit 104. The emergency exit 104 includes a note area where a user can add descriptive text, notes and other graphics to the emergency exit 104. Further, the emergency exit 104 can be fastened with a fastening means, such as a plurality of adhesive strips to a room floor plan 100, or other room fixture, or person characterization.

Figure 2G:
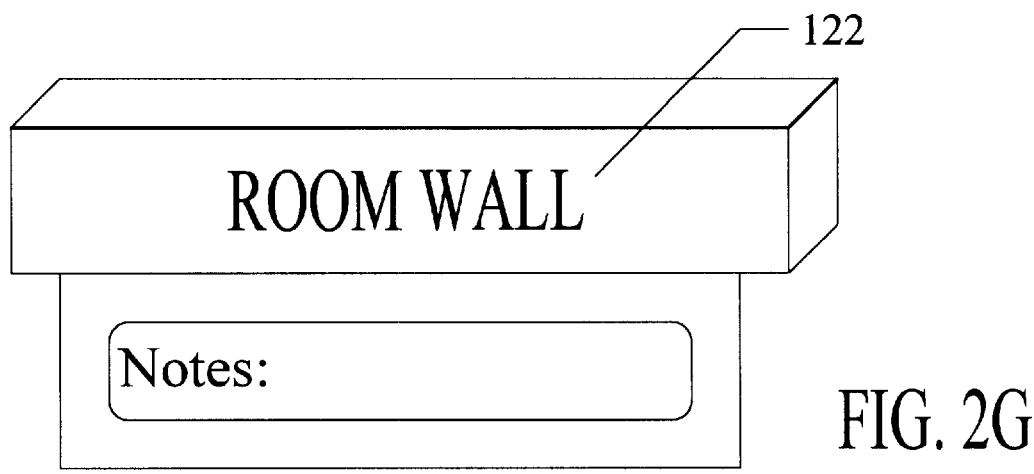

There is shown in FIG. 2G a room fixture representation of a room wall 122. The room wall 122 includes a note area where a user can add descriptive text, notes and other graphics to the room wall 122. Further, the room wall 122 can be fastened with a fastening means, such as a plurality of adhesive strips 146 to a room floor plan 100, or other room fixture, or person characterization.

Figure 2H:
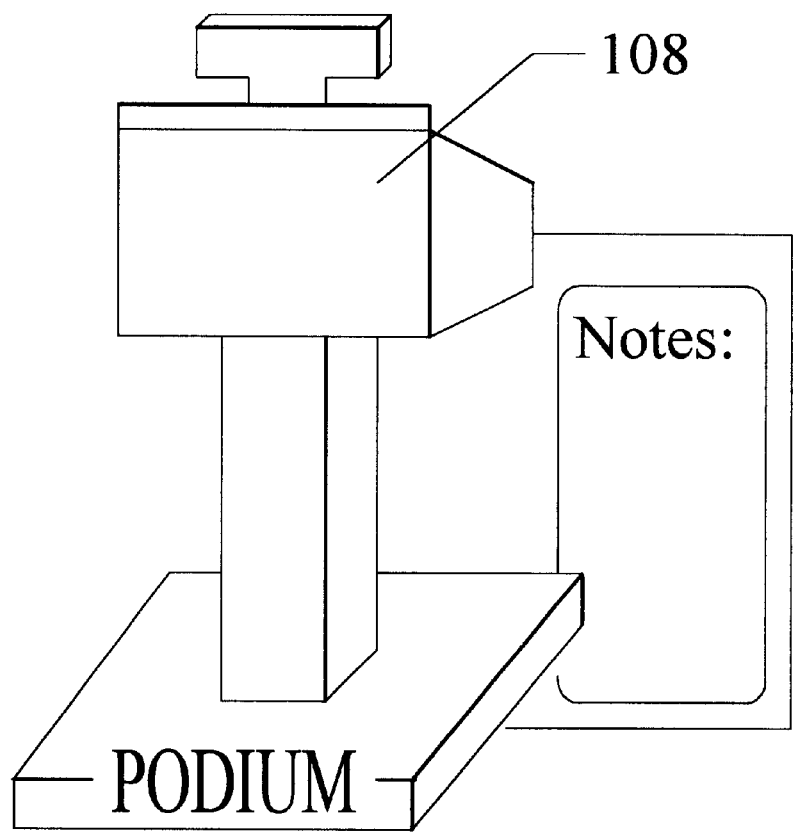

There is shown in FIG. 2H a room fixture representation of a podium 108. The podium 108 includes a note area where a user can add descriptive text, notes and other graphics to the podium 108. Further, the podium 108 can be fastened with a fastening means, such as a plurality of adhesive strips 146 to a room floor plan 100 or other room fixture or person characterization.

Figure 2I:
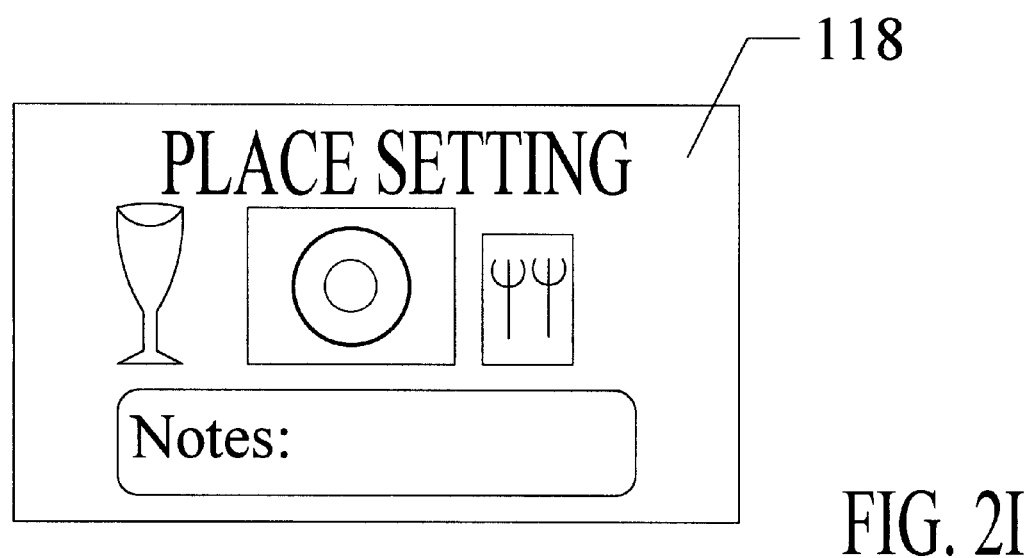

There is shown in FIG. 2I a room fixture representation of a place setting 118. The place setting 118 includes a note area where a user can add descriptive text, notes and other graphics to the place setting 118. Further, the place setting 118 can be fastened with a fastening means, such as a plurality of adhesive strips 146 to a room floor plan 100, or other room fixture, or person characterization.

Figure 2J:
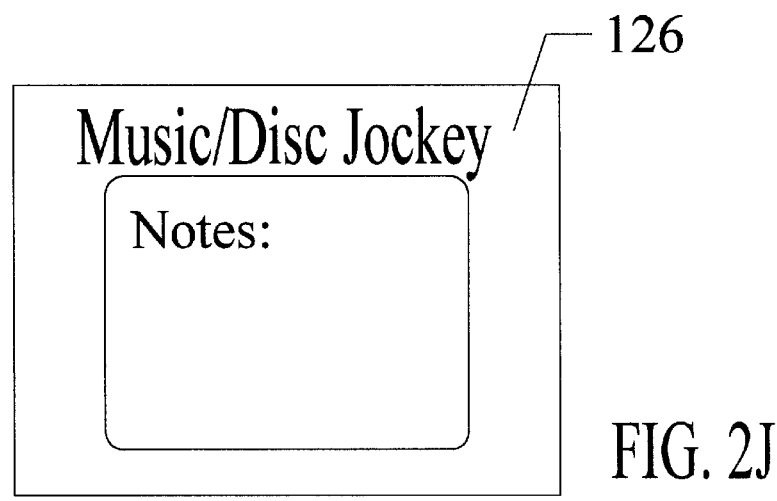

There is shown in FIG. 2J a room fixture representation of a music/disc jockey 126. The music/disc jockey 126 includes a note area where a user can add descriptive text, notes and other graphics to the music/disc jockey 126. Further, the music/disc jockey 126 can be fastened with a fastening means, such as a plurality of adhesive strips 146 to a room floor plan 100, or other room fixture, or person characterization.

Through non-limiting example a plurality of room fixtures aforementioned have been described. One skilled in art would recognize that other room fixtures are possible, and as required by the specific event being planned additional room fixtures could be implemented and embodied in an exemplary embodiment to best enable the planning of that specific event.

Figure 3A:
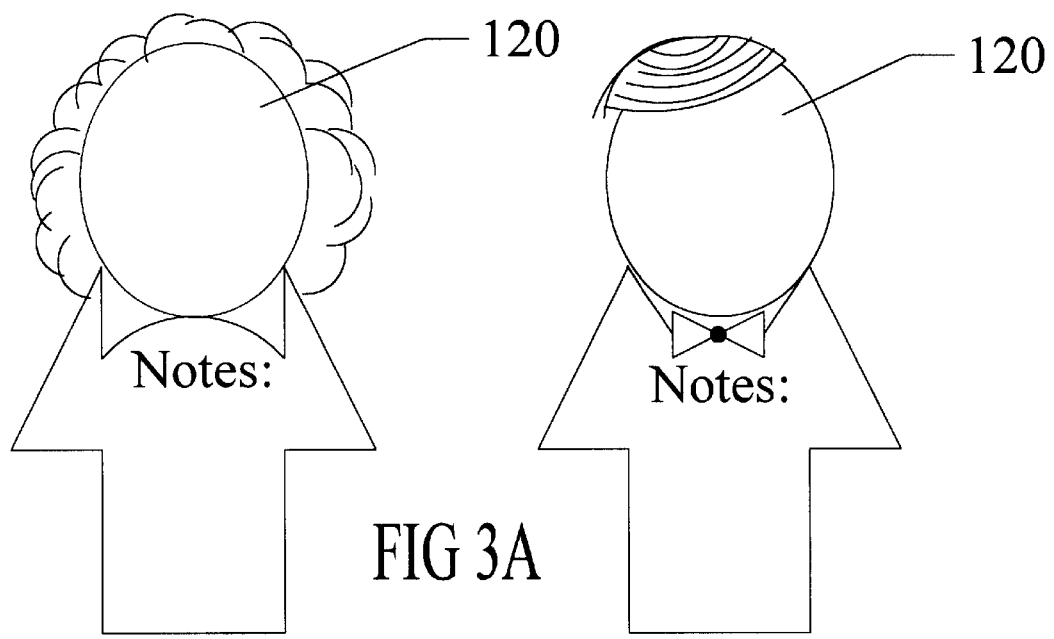
FIGS. 3A–3C show person characterizations
Figure 3B:
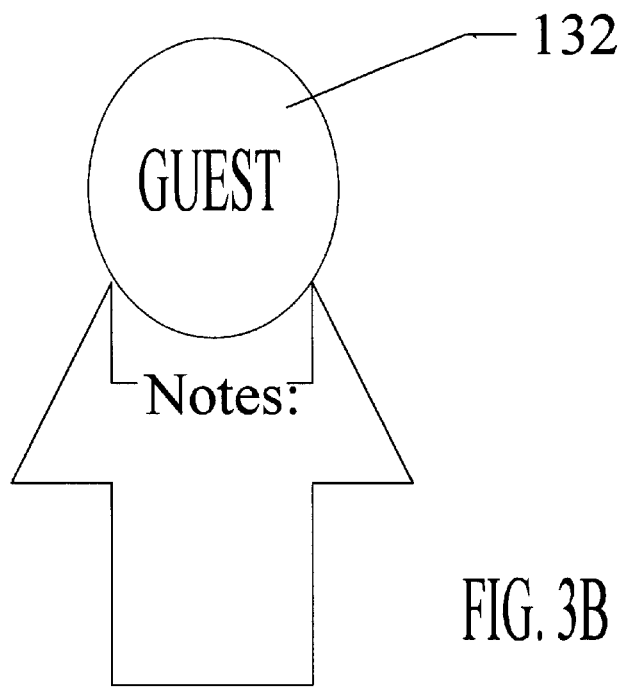
Figure 3C:
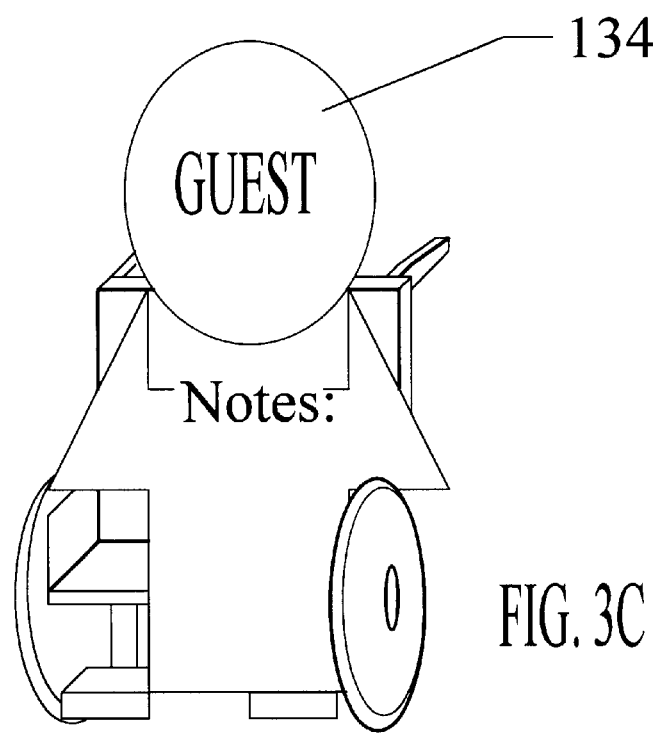

Referring to FIGS. 3A–3C there is shown a plurality of person characterizations. There is shown in FIG. 3A a person characterization representation of a key people 120. The key people 120 include a note area where a user can add descriptive text, notes and other graphics to the key people 120. Further, the key people 120 can be fastened with a fastening means, such as a plurality of adhesive strips 146 to a room floor plan 100, or other room fixture, or person characterization.

In an exemplary embodiment key people 120 can be person characterizations of a bride and groom, a Chief Executive Offices (CEO), a president, a key personality, a celebrity, or a key speaker. In general the key people 120 are key people attending the event.

There is shown in FIG. 3B a person characterization representation of a guest 132. The guest 132 includes a note area where a user can add descriptive text, notes and other graphics to the guest 132. Further, the guest 132 can be fastened with a fastening means, such as a plurality of adhesive strips 146 to a room floor plan 100, or other room fixture, or person characterization.

There is shown in FIG. 3C a person characterization representation of a special needs guest 134. The special needs guest 134 includes a note area where a user can add descriptive text, notes and other graphics to the special needs guest 134. Further, the special needs guest 134 can be fastened with a fastening means, such as a plurality of adhesive strips 146 to a room floor plan 100 or other room fixture or person characterization.

Through non-limiting example a plurality of person characterizations aforementioned have been described. One skilled in art would recognize that other person characterizations are possible, and as required by the specific event being planned additional person characterizations could be implemented and embodied in an exemplary embodiment to best enable the planning of that specific event.

Figure 4A:
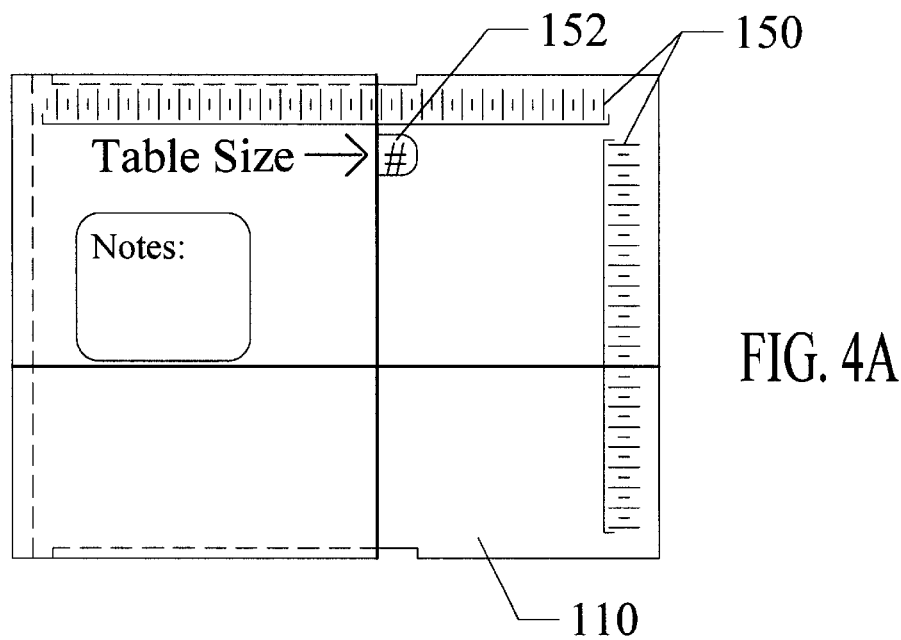
FIGS. 4A–4F show room fixture representation of scalable and resizable tables.
Figure 4B:
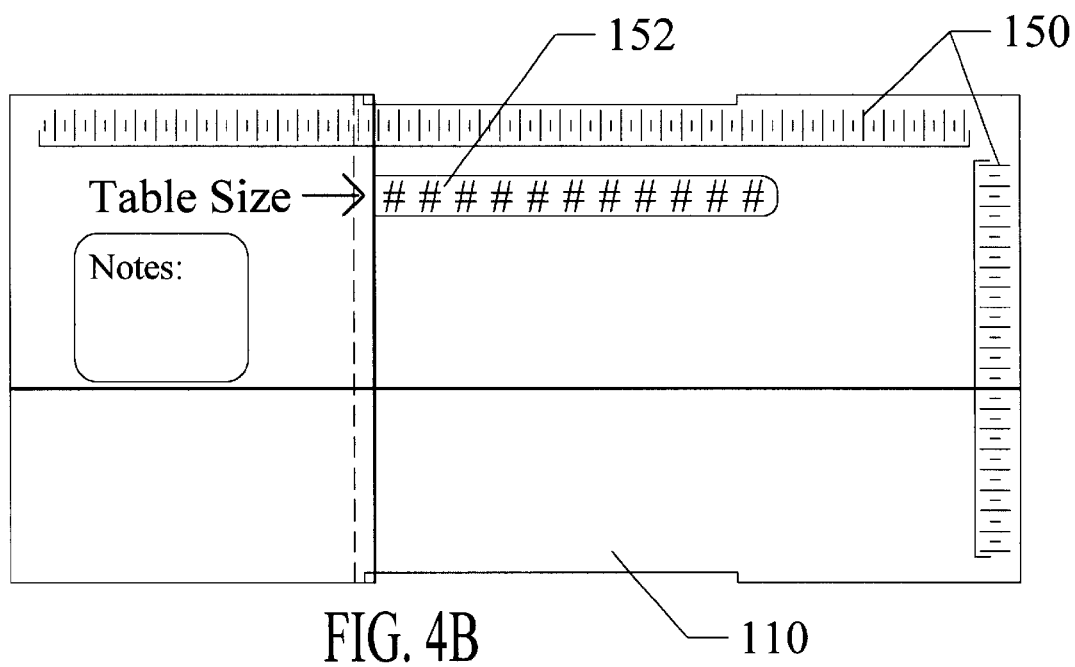

Referring to FIGS. 4A–4D there are shown a variety of scaleable and resizable room fixtures representing tables, and room floor plans. There is shown in FIG. 4A–4B a four-sided shape table 110 in a closed position (shortest table length FIG. 4A) and in an open position (longest table length FIG. 4B). The four-sided shape table 110 includes a note area where a user can add descriptive text, notes and other graphics to the four-sided shape table 110. Further, the four-sided shape table 110 can be fastened with a fastening means, such as a plurality of adhesive strips 146 to a room floor plan 100, or other room fixture, or person characterization. A four side shape table 110 includes a scale 150 and a size indicator 152.

The four-sided shape table 110 comprises one or more moveable parts that allow the four-sided shape table 110 to slide open and closed to create different size four-sided shape table 110. Further, a scale 150 is inscribed on the surface of the four-sided shape table 110, wherein by sliding the four-sided shape table 110 open and closed an effective change of length and or width of the four-sided shape table 110 occurs. The process of sliding the moveable parts of four-sided shape table 110 exposes different inscribed numbers, such as size indicator 152 and scale markings corresponding to the relative ratio and proportional size of the four-sided shape table 110—when compared to the actual table size the four-sided shape table 110 it is representing.

For example, when the four-sided shape table 110 is in the fully closed position, the moveable parts pushed as close together as possible, a reference number and scale position is visible on the surface of the four-sided shape table 110. Such a reference number and scale could indicate that the size of the four-sided shape table 110 is in a ratio proportional to the actual table to be located at the event. Such a size could be, for example, three feet in length. Sliding the moveable parts of the four-sided shape table 110 further apart, lengthens the four-sided shape table 110 and effectively changes the reference number and scale position on the surface of the four-sided shape table 110. The new reference number and scale indicate that the size of the four-sided shape table 110 is now in a ratio proportional to an actual table of, for example, six feet in length.

The four-sided shape table 110 dimensions can vary to any length and width. In an exemplary embodiment, a ratio proportional range of three feet at the shortest or closed position of the table and twelve feet at longest or most open position of the table, offer a users of the invention flexibility to scale and resize the four-sided shape table 110 for common events.

In general, the ability of scaling and resizing a table, such as four-sided shape table 110 allow a user of the invention to adjust the room fixtures to be in a ratio proportional to the actual room fixtures that will be utilized at the event. The four-sided table 110 does not have to be scaled, scaleable, resized or resizable to be functional.

A four-sided shape table 110 can be scaled and resized on any axis (for example table width and table length) without limitation. In an exemplary embodiment a four-sided shape table 10 can be fabricated to allow resizing and scalability, at a minimum of the length of the table and optionally allowing resizing and scalability of the width of the table. Further, fabrication can result in more than one reference number and or scale being exposed at different static placement positions of the four-sided shape table 110. In such cases an arrow can be inscribed on the surface of the four-sided shape table 110 to clearly identify the valid reference number and scale position.

Figure 4C:
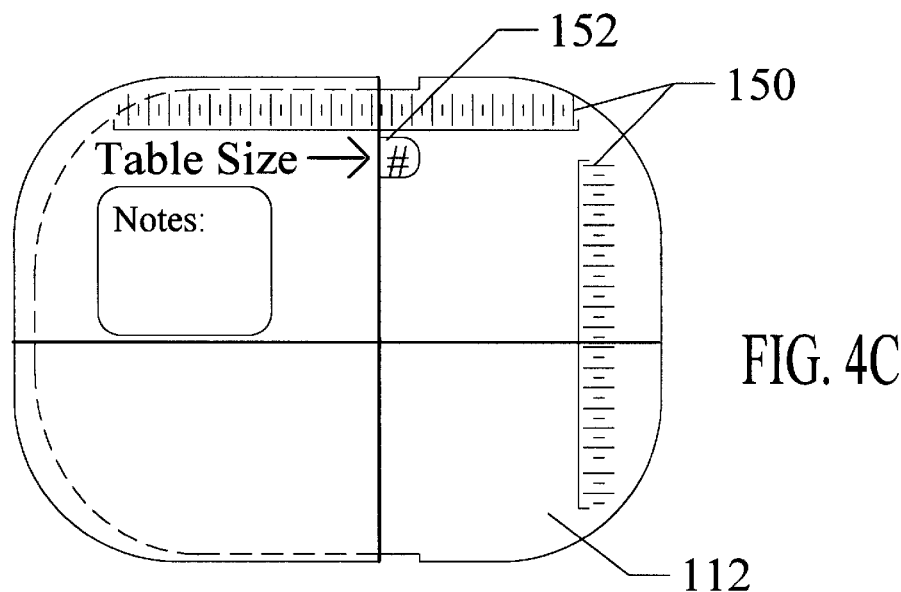
Figure 4D:
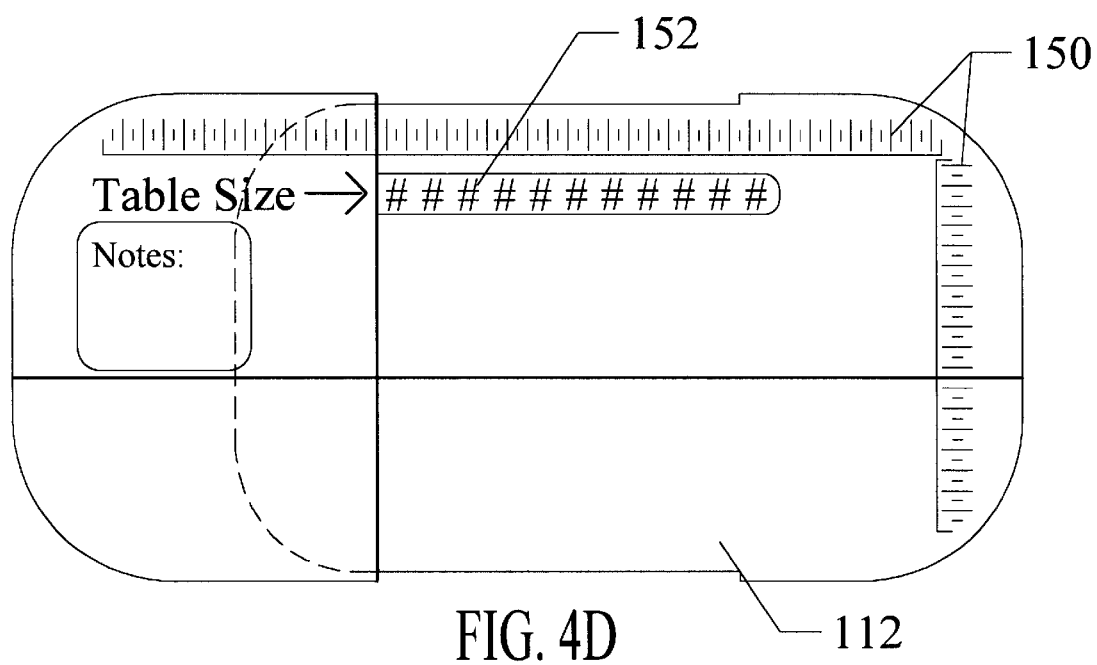

There is shown in FIGS. 4C and 4D an oval shape table 112 in a closed position (shortest table length FIG. 4C) and in an open position (longest table length FIG. 4D). The oval shape table 112 includes a note area where a user can add descriptive text, notes and other graphics to the oval shape table 112. Further, the oval shape table 112 can be fastened with a fastening means, such as a plurality of adhesive strips 146 to a room floor plan 100, or other room fixture, or person characterization. An oval shape table 112 includes a scale 150 and a size indicator 152.

The oval shape table 112 comprises one or more moveable parts that allow the oval shape table 112 to slide open and closed to create different size oval shape table 112. Further, a scale is inscribed on the surface of the oval shape table 112, wherein by sliding the oval shape table 112 open and closed an effective change of length and or width of the oval shape table 112 occurs. The process of sliding the moveable parts of oval shape table 112 exposes different inscribed numbers, such as size indicator 152 and scale 150 markings corresponding to the relative ratio and proportional size of the oval shape table 112—when compared to the actual table size the oval shape table 112 it is representing.

For example, when the oval shape table 112 is in the fully closed position, the moveable parts pushed as close together as possible, a reference number and scale position is visible on the surface of the oval shape table 112. Such a reference number and scale could indicate that the size of the oval shape table 112 is in a ratio proportional to the actual table to be located at the event. Such a size could be, for example, three feet in length. Sliding the moveable parts of oval shape table 112 further apart, lengthens the oval shape table 112 and effectively changes the reference number and scale position on the surface of the oval shape table 112. The new reference number and scale indicate that the size of the oval shape table 112 is now in a ratio proportional to an actual table of, for example, six feet in length.

The Oval shape table 112 dimensions can vary to any length and width. In an exemplary embodiment a ratio proportional range of three feet at the shortest or closed position of the table, and twelve feet at longest or most open position of the table offer a users of the invention suitable flexibility to scale and resize the oval shape table 112 for common events.

In general, the ability of scaling and resizing a table, such as oval shape table 112 allow a user of the invention to adjust the room fixtures to be in a proportional ratio to the actual room fixtures that will be utilized at the event. The oval shape table 112 does not have to be scaled, scaleable, resized, or resizable to be functional.

An oval shape table 112 can be scaled and resized on any axis (for example table width and table length) without limitation. In an exemplary embodiment the oval shape table 112 can be fabricated to allow resizing and scalability, at a minimum of the length of the table and optionally allowing resizing and scalability of the width of the table. Further, fabrication can results in more than one reference number and or scale being exposed at different static placement positions of the oval shape table 112. In such cases an arrow can be inscribed on the surface of the oval shape table 112 to clearly identify the valid reference number and scale position.

Figure 4E:
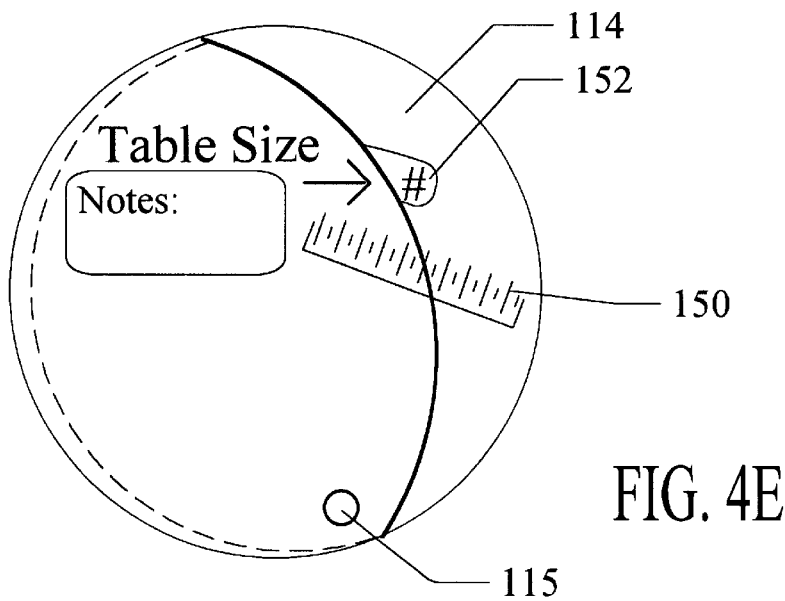
Figure 4F:
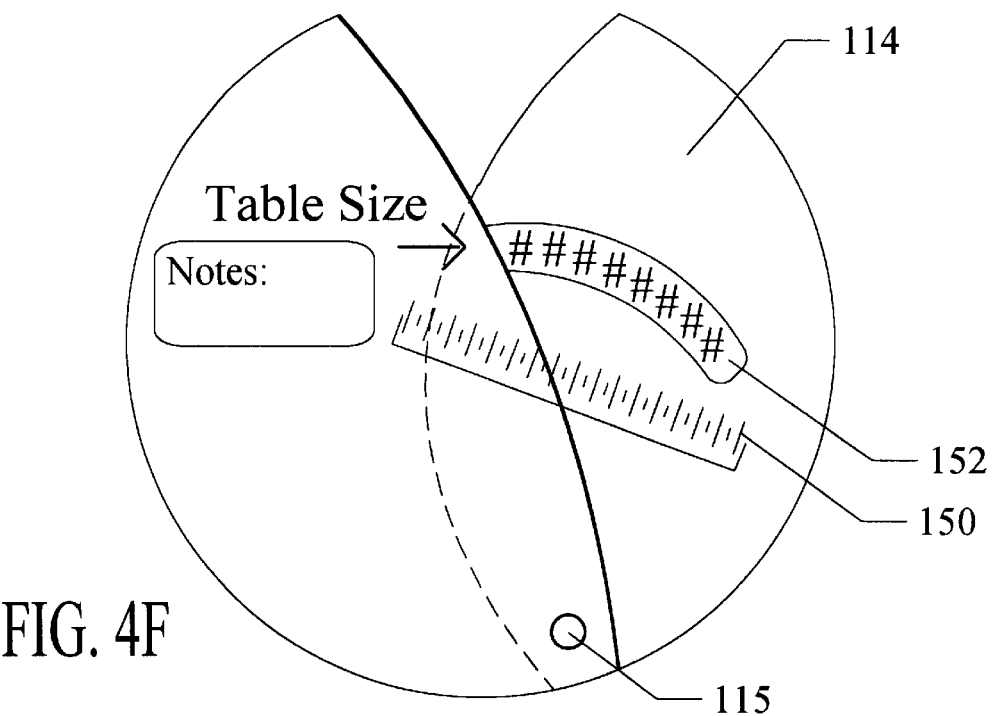

There is shown in FIG. 4E and FIG. 4F a round shape table 114 in a closed position (shortest table diameter FIG. 4E) and in an open position (longest table diameter FIG. 4F). The round shape table 114 includes a note area where a user can add descriptive text, notes and other graphics to the round shape table 114. Further, the round shape table 114 can be fastened with a fastening means, such as a plurality of adhesive strips 146 to the room floor plan 100, or other room fixture, or person characterization. A round shape table 114 includes a scale 150 and a size indicator 152.

The round shape table 114 comprises one or more moveable parts that allow the round shape table 114 to slide open and closed to create different size round shape table 114. Further, a scale 150,and size indicator 152 are inscribed on the surface of the round shape table 114, wherein by sliding the round shape table 114 open and closed an effective change of diameter of the round shape table 114 occurs. A rivet 115 can be used to fasten the two or more pieces of the round shape table 114 around which the moveable parts can pivot. The process of sliding the moveable parts of round shape table 114 exposes different inscribed numbers and scale markings corresponding to the relative ratio and proportional size of the round shape table 114—when compared to the actual table size the round shape table 114 is representing.

For example, when the round shape table 114 is in the fully closed position, the moveable parts pushed as close together as possible, a reference number and scale position is visible on the surface of the round shape table 114. Such a reference number and scale could indicate that the size of the round shape table 114 is in a ratio proportional to the actual table to be located at the event. Such a size could be, for example, three feet in diameter. Sliding the moveable parts of the round shape table 114 further apart, lengthens the diameter of the round shape table 114 and effectively changes the reference number and scale position on the surface of the round shape table 114. The new reference number and scale could indicate that the size of the round shape table 114 is now in a ratio proportional to an actual table of, for example, six feet in diameter.

The round shape table 114 dimensions can vary to any diameter. In an exemplary embodiment a ratio and proportional range of three feet, at the shortest diameter or closed position of the table, and twelve feet, at longest diameter or most open position of the table, offer a user of the invention suitable flexibility to scale and resize the room floor plan 100 for common events. The round shape table 114 does not have to be scaled, scaleable, resized, or resizable to be functional.

In general, the ability of scaling and resizing a table, such as the round shape table 114 allow a user of the invention to adjust the room fixtures to be in a ratio proportional to the actual room fixtures that will be utilized at the event.

A round shape table 114 can be scaled and resized on any axis (for example table diameter) without limitation. In an exemplary embodiment a round shape table 114 can be fabricated to allow resizing and scalability, at a minimum of the diameter of the table. Further, fabrication can results in more than one reference number and or scale being exposed at different static placement positions of the round shape table 114. In such cases an arrow can be inscribed on the surface of the round shape table 114 to clearly identify the valid reference number and scale position.

Figure 4G:
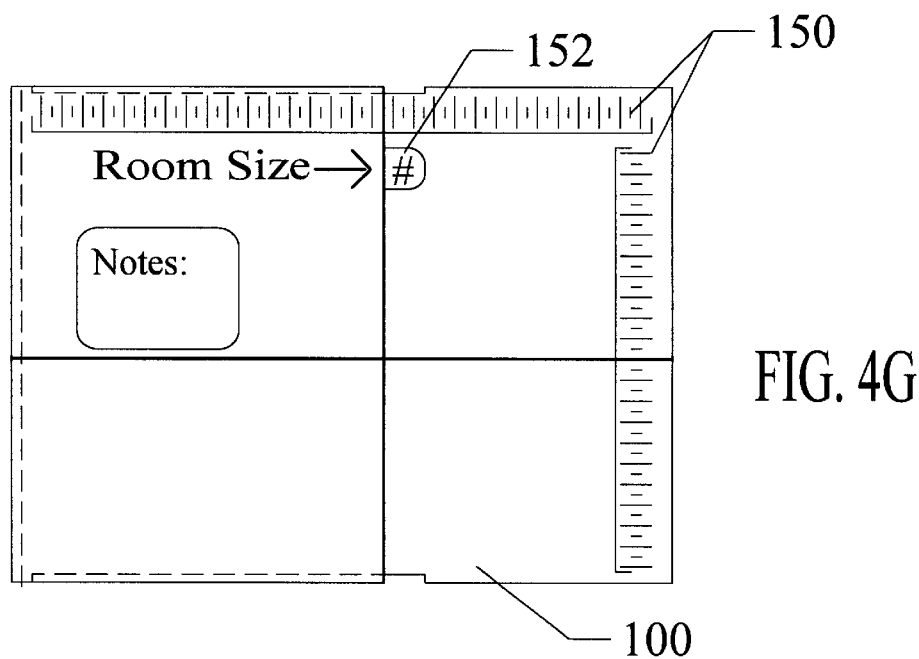
FIGS. 4G and 4H shows a scalable and resizable room floor plan.
Figure 4H:
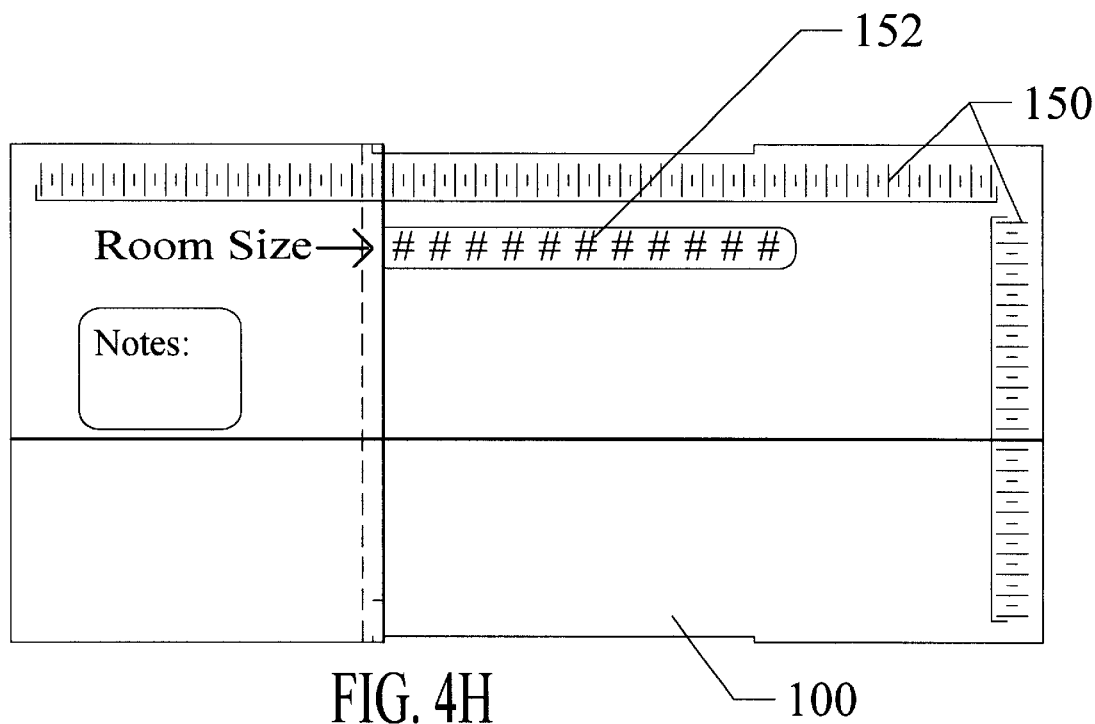

There is shown in FIGS. 4G and 4H a room floor plan 100 in a closed position (shortest room floor plan length FIG. 4G) and in an open position (longest room floor plan length FIG. 4H). The room floor plan 100 includes a note area where a user can add descriptive text, notes and other graphics to the room floor plan 100. Further, the room floor plan 100 can be fastened with a fastening means, such as a plurality of adhesive strips 146 to a room floor plan 100, or other room fixture, or person characterization. A room floor plan 100 includes a scale 150 and a size indicator 152.

In an exemplary embodiment a room floor plan 100 can represent a room where the event is to take place. Additionally, a room floor plan 100 could represent any room, house, building, or other structure or dwelling. Further, a room floor plan 100 can represent any floor or combination of floors including the entire structure in a house, building or other structure or dwelling. Further, a room floor plan 100 can be an outdoor setting such as a backyard, fenced in area, or other defined outdoor area.

The room floor plan 100 comprises one or more moveable parts that allow the room floor plan 100 to slide open and closed to create different size room floor plan 100. Further, a scale 150, and size indicator 152 are inscribed on the surface of the room floor plan 100, wherein by sliding the room floor plan 100 open and closed an effective change of length and or width of the room floor plan 100 occurs. The process of sliding the moveable parts of room floor plan 100 exposes different inscribed numbers and scale markings corresponding to the relative ratio and proportional size of the room floor plan 100—when compared to the actual table size the room floor plan 100 is representing.

For example, when the room floor plan 100 is in the fully closed position, the moveable parts pushed as close together as possible, a reference number and scale position is visible on the surface of the room floor plan 100. Such a reference number and scale could indicate that the size of the room floor plan 100 is in a ratio proportional to the actual table to be located at the event. Such a size could be, for example, thirty feet in length. Sliding the moveable parts of room floor plan 100 further apart lengthens the room floor plan 100 and effectively changes the reference number and scale position on the surface of the room floor plan 100. The new reference number and scale indicate that the size of the room floor plan 100 is now in a ratio proportional to an actual room floor plan size of, for example, 100 feet in length.

The room floor plan 100 dimensions can vary to any length and width. In an exemplary embodiment a ratio and proportional range of 30 feet, at the shortest or closed position of the table, and 100 feet, at longest or most open position of the table, offer a user of the invention suitable flexibility to scale and resize the room floor plan 100 for common events.

In general, the ability of scaling and resizing a table, such as room floor plan 100 allow a user of the invention to adjust the room fixtures to be in a ratio proportional to the actual room fixtures that will be utilized at the event.

A room floor plan 100 can be scaled and resized on any axis (for example table width and table length) without limitation. In an exemplary embodiment the room floor plan 100 can be fabricated to allow resizing and scalability, at a minimum of the length of the table and optionally allowing resizing and scalability of the width of the table. Further, fabrication can results in more than one reference number and or scale being exposed at different static placement positions of the room floor plan 100. In such cases an arrow can be inscribed on the surface of the room floor plan 100 to clearly identify the valid reference number and scale position.

Through non-limiting example a plurality of tables and room floor plan aforementioned have been described. One skilled in art would recognize that other table an room floor plan geometric shapes are possible and as required by the specific event being planned additional geometric shape tables and room floor plans could be implemented and embodied in an exemplary embodiment to best enable the planning of that specific event.

Figure 5A:
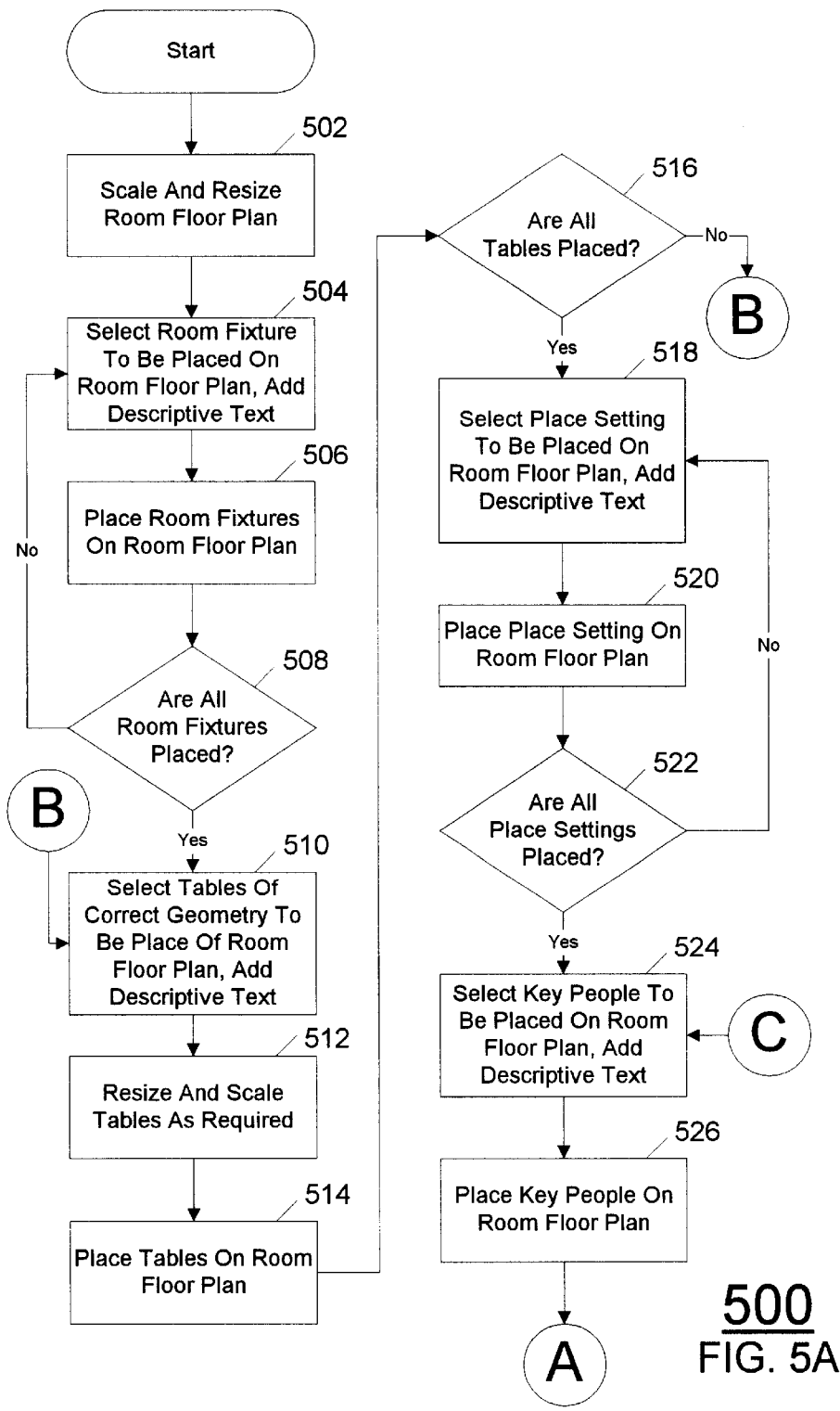
FIGS. 5A and 5B shows an event planning room layout routine 500.
Figure 5B:
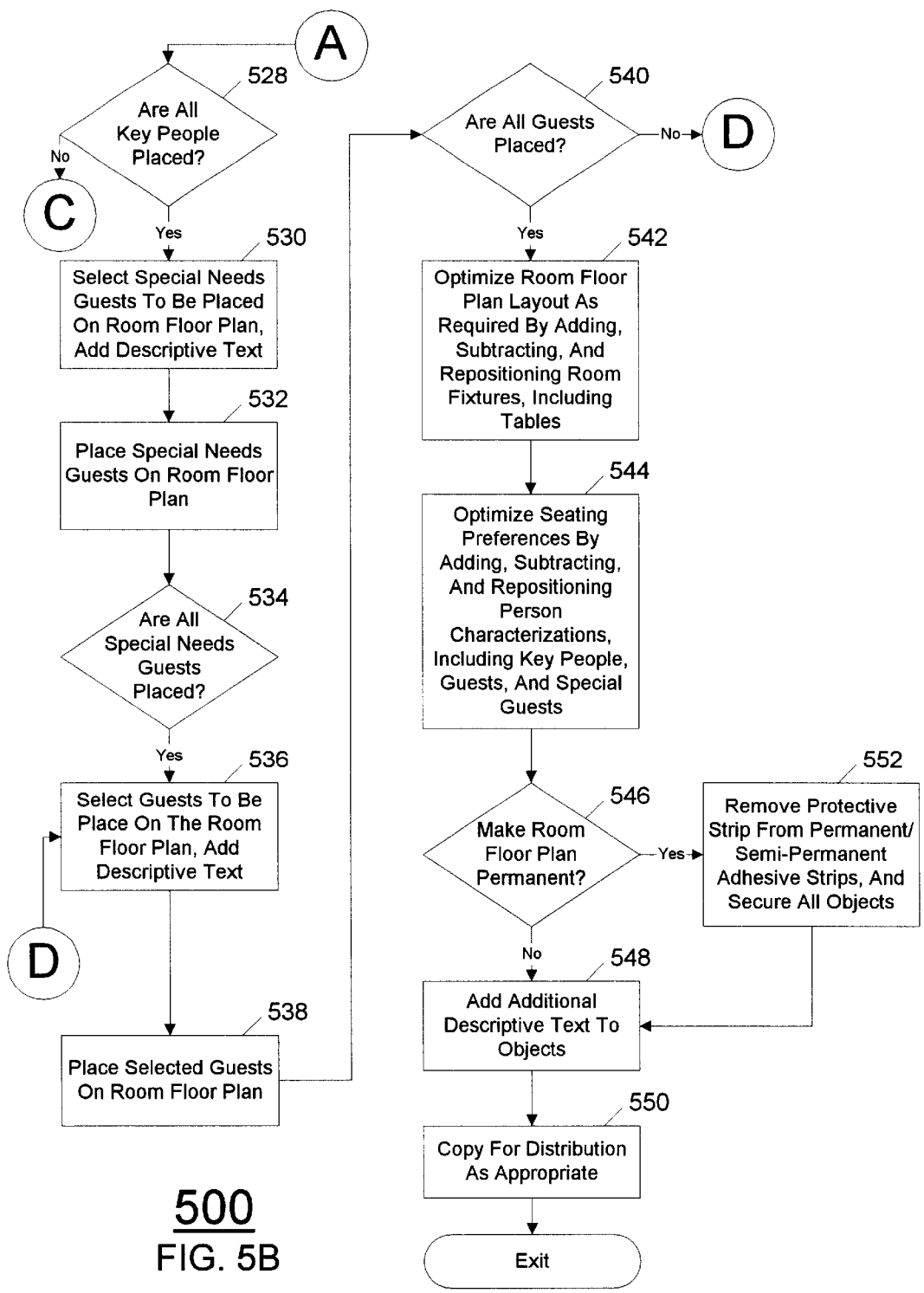

Referring to FIGS. 5A and 5B there is shown an event planning routine 500. In an exemplary embodiment this routine effectuates a sequence of steps resulting in the assembly of an event plan for implementing a system and organizational scheme for an event room, and preparing an event-seating chart. For purposes of disclosure a user includes event organizers, and other individuals that may use the system and method in preparation of an event plan including planning of an event room layout and event seat preference plans.

The process begins in block 502 where room floor plan 100 is resized and scaled to represent the actual geometric proportion of the event room. The user can coarsely scale the room floor plan 100 or more precisely adjust the room dimensions. For example if the event room is estimated to be longer then wider by a factor of two, room floor plan 100 can be adjusted to an approximate ratio proportional to the actual room size. If however more precise measurements are known then the user can use the scale inscribed on the perimeter on room floor plan 100 to more accurately adjust the dimension of the room floor plan 100. When the appropriate adjustments have been effectuated the planning process moves to block 504.

Figure 6:
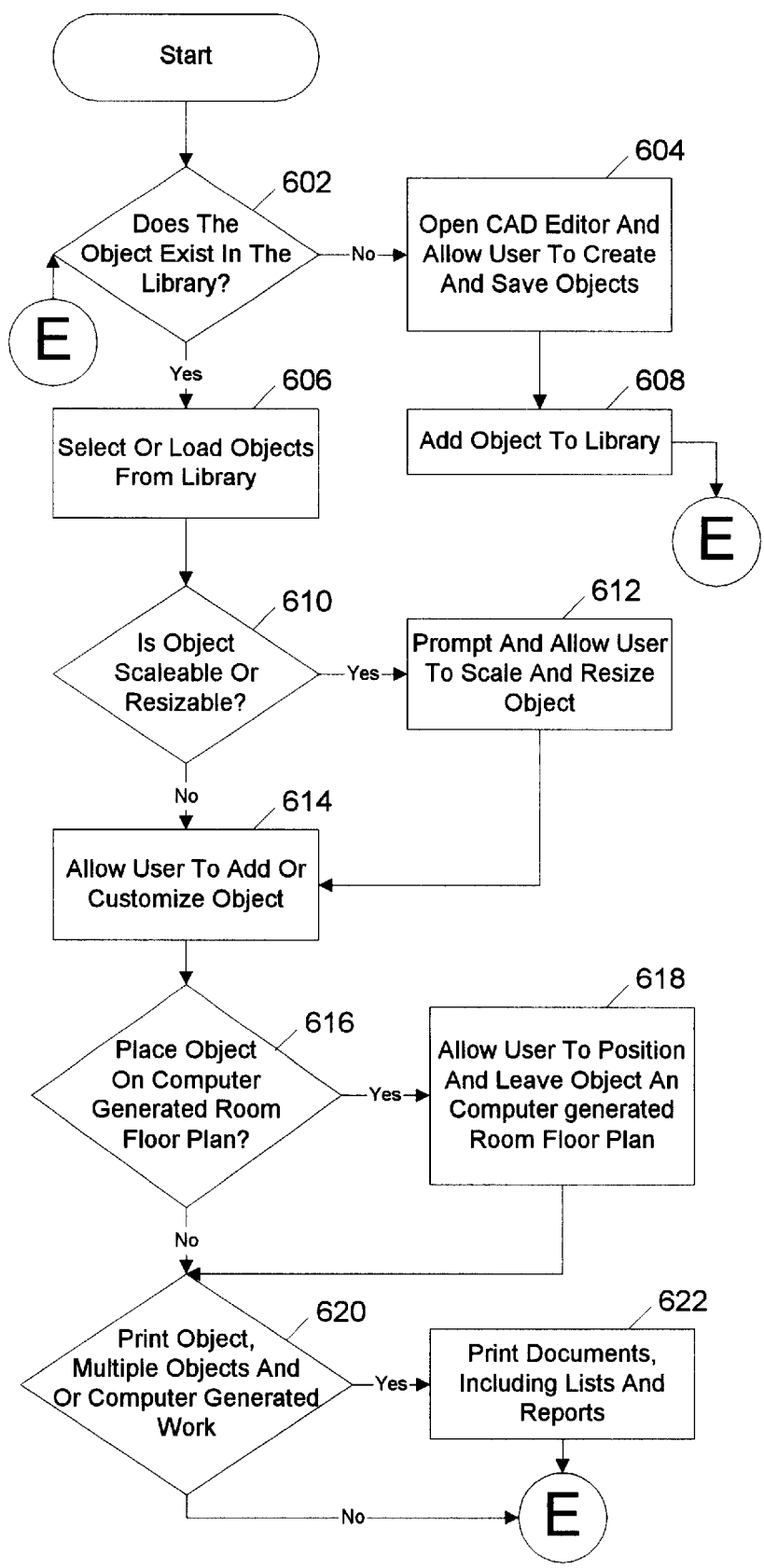
FIG. 6 shows a personal computer room fixture, floor plan, and people generation routine 600.

In block 504 the user selects room fixtures (typically excluding four-sided shape table 110, oval shape table 112, and round shape table 114) from a group of related and unrelated room fixtures. Text and other descriptions can be added to the room fixtures. Such text and other descriptions can include note, comments, descriptions, or other relevant information. Room fixtures can be supplied to the user in kit or other form, made of a polymer, plastic, or cut from paper comprising a plurality of room fixtures. Additionally, room fixtures can be computer generated and printed. FIG. 6 describes a routine for creating computer generated room objects and person characterizations. After a room fixture has been selected the planning process moves to block 506.

In block 506 the user places the selected room fixture from block 504 on room floor plan 100. The user can elect to place the room fixture without fastening the room fixture to the room floor plan 100. The user could also choose to lightly-adhere the room fixture to the room floor plan 100 with a magnet or light adhesive, such as with adhesive 146. Alternatively, placement may require a more permanent fastener means in which case a stronger semi-permanent adhesive can be utilized. After a room fixture has been placed planning processing moves to decision block 508.

In decision block 508 the user is asked if all the room fixtures have been placed. If the result is in the affirmative, that is all the room fixtures have been placed then the planning process moves to block 510. If the resultant is in the negative, that is all the room fixtures have not been placed then the user is prompted to return to planning process block 502.

In planning block 510 the user selects tables, such as four-sided shape table 110, oval shape table 112, and round shape table 114 for placement on the room floor plan 100. Text and other descriptions can be added to the tables. Such text and other descriptions can include notes, comments, descriptions, or other relevant information. After the user has selected a table planning processing moves to block 512.

In planning process block 512 the table selected in planning processing block 510 is scaled and resized by the user. The user can utilize the scale inscribed in the perimeter of the table to resize the table to reflect proportional size measurement of the actual table. Planning processing then moves to block 514.

In block 514 the user places the selected table (room fixture) from block 512 on the room floor plan 100. The user can elect to place the table without fastening the table to the room floor plan 100. The user could also choose to lightly-adhere the table to the room floor plan 100 with a magnet or light adhesive, such as adhesive 146. Alternatively placement may require a more permanent fastener in which case a stronger semi-permanent adhesive can be utilized. After a table has been placed planning processing moves to decision block 516.

In decision block 516 the user is asked if all the tables have been placed. If the result is in the affirmative, that is all the tables have been placed then the planning process moves to block 518. If the resultant is in the negative, that is all the tables have not all been placed then the user is prompted to return to planning process block 510.

In planning block 518 the user selects place settings, such as place setting 118. Text and other descriptions can be added to the place settings. Such text and other descriptions can include note, comments, descriptions, or other relevant information. After the user has selected a place setting processing moves to block 520.

In block 520 the user places the selected place setting from block 518 on the room floor plan 100. The user can elect to place the place setting without fastening the place setting to the room floor plan 100. The user could also choose to lightly-adhere the place setting to the room floor plan 100 with a magnet or light adhesive, such as adhesive 146. Alternatively, placement may require a more permanent fastener in which case a stronger semi-permanent adhesive can be utilized. After a place setting has been placed planning processing moves to decision block 522.

In decision block 522 the user is asked if all the place settings have been placed. If the result is in the affirmative, that is all the place setting have been placed then the planning process moves to block 524. If the resultant is in the negative, that is all the place settings have not been placed then the user is prompted to return to planning process block 518.

In planning block 524 the user selects a key person or person characterization, such as key people 120. Text and other descriptions can be added to the person characterizations. Such text and other descriptions can include note, comments, descriptions, or other relevant information. After the user has selected a key person or person characterization processing moves to block 526.

In block 526 the user places the selected key person from block 524 on the room floor plan 100. The user can elect to place the key person without fastening the key person to the room floor plan 100. The user could also choose to lightly-adhere the key person to the room floor plan 100 with a magnet or light adhesive, such as adhesive 146. Alternatively, placement may require a more permanent fastener in which case a stronger semi-permanent adhesive can be utilized. After a place setting has been placed planning processing moves to decision block 528.

In decision block 528 the user is asked if all the key people have been placed. If the result is in the affirmative, that is all the key people have been placed then the planning process moves to block 530. If the resultant is in the negative, that is all the key people have not been placed then the user is prompted to return to planning process block 524.

In planning block 530 the user selects special needs guests, such as special needs guest 134. Text and other descriptions can be added to the special needs guests. Such text and other descriptions can include note, comments, descriptions, or other relevant information. After the user has selected a special need person processing moves to block 532.

In block 532 the user places the selected special need guest from block 530 on room floor plan 100. The user can elect to place the special needs guest without fastening the place setting to the room floor plan 100. The user could also choose to lightly-adhere the special needs guest to the room floor plan 100 with a magnet or light adhesive, such as adhesive 146. Alternatively, placement may require a more permanent fastener in which case a stronger semi-permanent adhesive can be utilized. After a special needs guest has been placed planning processing moves to decision block 534. If there are no special needs guest that requires placement then planning processing move to block 536.

In decision block 534 the user is asked if all special needs guests have been placed. If the result is in the affirmative, that is all the special needs guests have been placed then the planning process moves to block 536. If the resultant is in the negative, that is all special needs guests have not been placed then the user is prompted to return to planning process block 530.

In planning block 536 the user selects guests, such as guest 132. Text and other descriptions can be added to the guests. Such text and other descriptions can include note, comments, descriptions, or other relevant information. After the user has selected a guest processing moves to block 538.

In block 538 the user places the guest from block 536 on room floor plan 100. The user can elect to place the guest without fastening the place setting to the room floor plan 100. The user could also choose to lightly-adhere the guest to the room floor plan 100 with a magnet or light adhesive, such as adhesive 146. Alternatively, placement may require a more permanent fastener in which case a stronger semi-permanent adhesive can be utilized. After a guest has been placed planning processing moves to decision block 540.

In decision block 540 the user is asked if all guests have been placed. If the result is in the affirmative, that is all the guests have been placed then the planning process moves to block 542. If the resultant is in the negative, that is all the guests have not been placed then the user is prompted to return to planning process block 536.

In planning processing block 542 the user can optimize the room layout. Optimization can be by way of addition, subtraction or relocation of room fixtures, person characterizations or any other object on the room floor plan 100. Further, optimization can include the resizing and scaling of room fixtures such as four-sided shape table 110, oval shape table 112, round shape table 114, or room floor plan 100. Planning processing then moves to block 544.

In planning processing block 544 the user can optimize the seating arrangement and seating preferences in the room layout. Optimization can be by way of addition, subtraction or relocation of person characterizations, such as key people 120, special needs guest 134, guest 132, or any other object on the room floor plan 100. Planning processing the moves to decision block 546.

In planning decision block 546 the user can elect to make the room layout more durable by fastening loose room fixtures and person characterizations to room floor plan 100. If the resultant is in the affirmative, that is the users elects to make the room layout more durable be fastening loose room fixtures then processing moves to block 552. If the resultant is in the negative then planning processing moves to block 548.

In process planning block 552 the user can choose to lightly-adhere all objects, including the room fixtures, and person characterizations to the room floor plan 100. Objects can be secured with a magnet or light adhesive, such as adhesive 146. Alternatively, a more permanent fastener can be used to form a stronger more permanent/semi-permanent adhesion.

In planning processing block 548 the users can add descriptive text to any room floor plan, room fixture or person characterization. In an exemplary embodiment such descriptive text can be guest names, event setup instructions, instructions, special food need or other special needs or event information. Further, descriptive text can include notes to the caterers or general informational or reminder type of comments.

As required, in process planning step 550 the final room floor plan, person characterization, or other reports or lists generated during the planning steps can be reproduced for the purposes of distribution. The routine is then exited.

There is shown is FIG. 6 a room fixture and person characterization generation routine 600. Through the utilization of a personal computer, such as personal computer system 800 and the following software routine room fixtures and person characterizations can be generated, designed, customized, printed, and placed on a computer generated room floor plan, such as the room floor plan 100. Further, objects can be stored and retrieved from a library database of object. In general objects can be room floor plans, room fixtures, and person characterizations.

For purpose of disclosure a personal computer, such as personal computer system 800 can be any computer capable of running a traditional operating system such as WINDOWS 95, WINDOWS 98, WINDOWS CE, WINDOWS NT, MSDOS, UNIX, OSR, OSR2. Further, traditional operating systems include those that run on APPLE COMPUTER platforms. Such a personal computer can include without limitation PC equipment manufactured by or on behalf of IBM, COMPAC, HEWLETT PACKARD, DELL, GATEWAY, PC "clone" makers, and APPLE COMPUTER. Personal computer system 800 is described as a personal computer.

Processing begins in decision block 602 where based on user input it is determined if the selected or desired object already exists in the library database. If the resultant is in the affirmative, that is the selected or desired object already exists in the library database then processing moves to block 606. If the resultant is in the negative, that is the selected or desired object does not exist in the library database then processing moves to block 604.

Processing in block 604 opens a Computer Aided Drafting (CAD) window to allow a user to create new object or modify an existing object—effectively creating a new derivative of an existing object. The user can save objects into the library database, as well as retrieve and delete objects from the library database. A user can create a new library database. Processing then moves to block 608.

In block 608 the newly created or modified image is added to the library where a users can now select the object as though it exists in the library database. Processing returns to decision block 602.

Processing in block 606 selects or loads the selected object from the database. Processing then moves to decision block 610.

Processing in decision block 610 determines if the selected object is scalable or resizable. Such objects can include four-sided shape table 110, oval shape table 112, and round shape table 114. Further, such objects can include room floor plan 100. If the resultant is in the affirmative, that is the selected object is scalable or resizable then processing moves to block 612. If the resultant is in the negative, that is the selected object is not scaleable or resizable then processing moves to block 614.

In block 612 the user is prompted to scaling and or resizing the selected object. Scaling and or resize occur if required and processing moves to block 614.

In block 614 the user is prompted, and allowed to customize the selected object. Object customization can include editing the object shape and size, adding descriptive text, icons, or symbols or graphics to the object. Such descriptive text can include guest names, comments, notes, or other informative information. Such icons and symbols can include check marks, bullet point, exclamation points or other icons and symbols desired by the user. Processing then moves to decision block 616.

In decision block 616 it is determined whether the user desires to place the selected and customized object on a computer generated room floor plan. If the resultant is in the affirmative, that is the user desires to place the selected and customized object on a computer generated room floor plan then processing moves to block 618. If the resultant is in the negative, that is the user does not desire to place the selected and or customized object on a computer generated room floor plan then processing moves to decision block 620.

Processing in block 618 allows the user to position, place, and leave the selected and or customized object on a computer generated room floor plan. The computer generated floor plan can be saved as a library object. Alternatively the computer generated floor plan can be saved as a custom floor plan in a separate database. Processing then moves to decision block 620.

In decision block 620 the user is prompted as to whether to print the selected and or customized object or room floor plan. If the resultant is in the affirmative, the user desires to print then processing moves to block 622. If the resultant is in the negative, the user does not desire to print then processing returns to block 602. If the user is complete the routine is exited.

In block 622 the selected object and or customized object or room floor plans are printed. The user can select single or multiple copies as well as select various printing options. Various printing options can include color or black and white, paper orientation (landscape or portrait), high resolution, different fonts, etc.

Figure 7B:
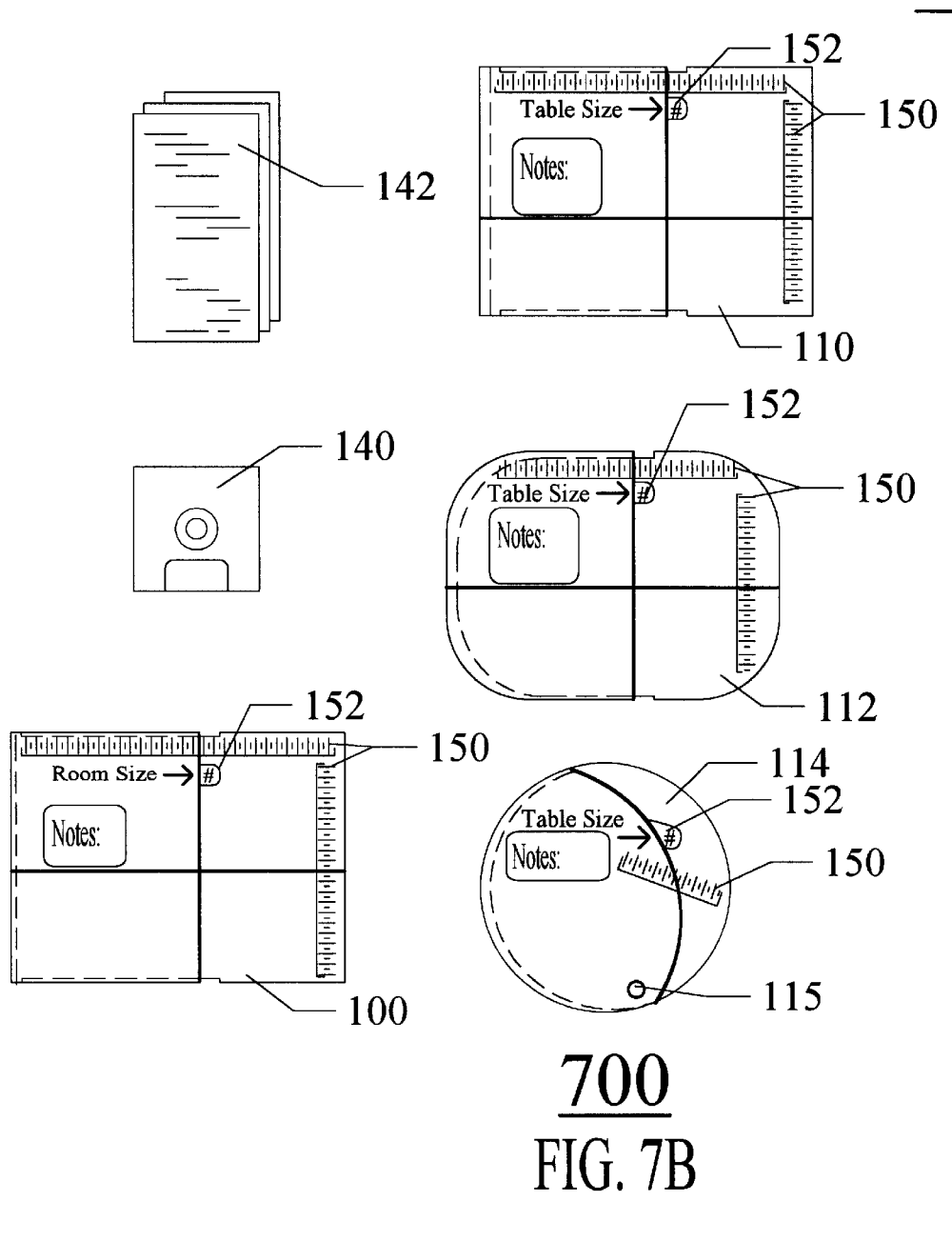

There is shown in FIGS. 7A and 7B an event planning kit 700. The contents and quantity of items can vary for different events. For example, a kit could be assembled to event. Additionally, a different kit could be assembled to provide enough materials to accommodate one hundred guests for a shareholder's meeting event.

In an exemplary embodiment numerous different kit sizes could be assembled and made available to accommodate different types of events, and varying size of events. For example wedding reception kits for 50 guests, 100 guests, 200 guests, 500 guests, and 1000 guests could be prepared with different kit contents and quantities and types of room fixtures and person characterizations. Additionally, a similar variety of kit sizes could be assembled and made available for other common events such as business functions, and parties. Kits can also be combined to produce in between combination. For example a kit for 50 guests can be combined with a kit for 100 guests to provide sufficient materials for a 150-guest event.

A standard kit can comprise a room floor plan 100, a plurality of doors 102, a plurality of emergency exits 104, a plurality of general room artifacts 106, and a plurality of podiums 108. A standard kit can also comprise a plurality of scalable and resizable tables including a plurality of four-sided shape table 100, a plurality of oval shape tables 112, and a plurality of round shape tables 114. A standard kit can comprise a plurality of dance floors 116, a plurality of place settings 118, a plurality of key people 120, a plurality of room walls 122, a plurality of stages 124, a plurality of music/disc jockey areas 126, and a plurality music/disc jockey areas 126. Further, a standard kit can comprise a plurality of lighting 128, a plurality of notepads 130, a plurality of guests 132, and a plurality of special need guests 134, a plurality of adhesive strips 146, a computer program disk 140, and an instruction booklet 142. A computer program disc can be any software storage medium such as compact disc read only memory (CDROM), floppy disk, or other suitable data storage and transport medium.

Figure 8:
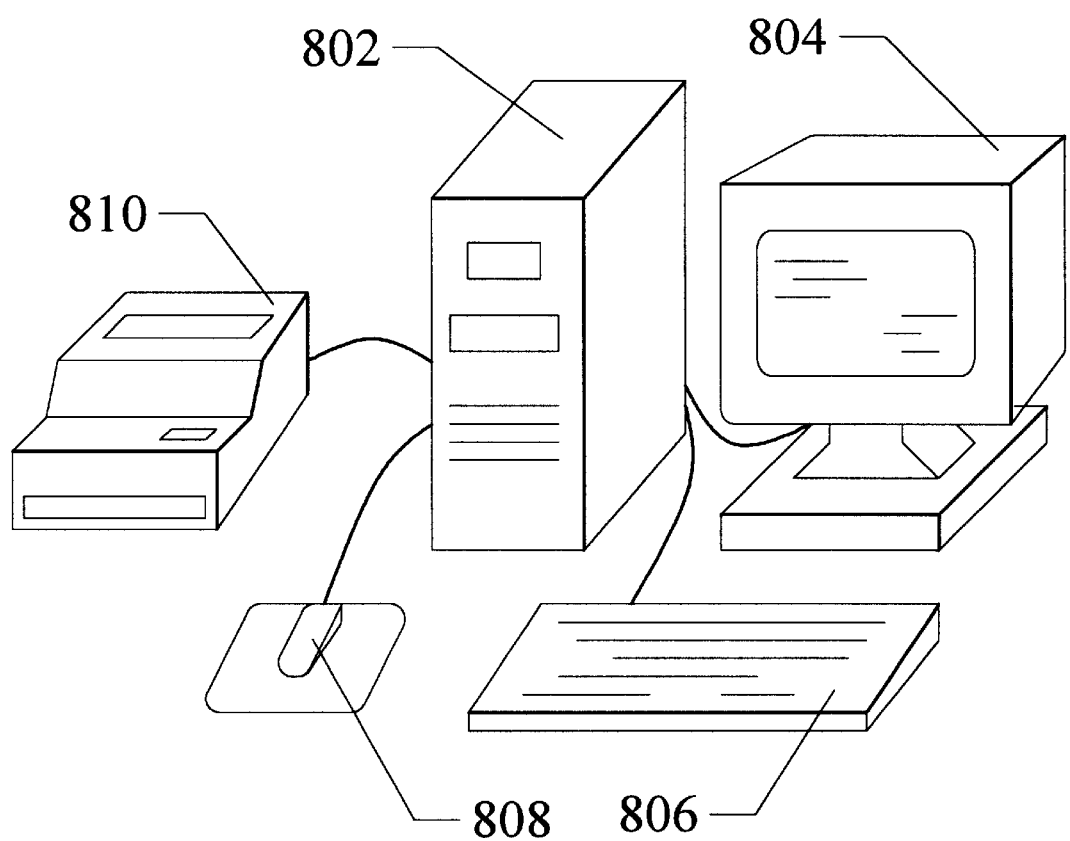
FIG. 8 shows a personal computer (PC) system 800.

Referring to FIG. 8, there is shown a personal computer system 800. A computer processor 802 is interconnected with a monitor 804, a keyboard 806, a pointing device such as a mouse 808, and a printer 810. Personal computer system can be referred to generally as a personal computer (PC).

Computer generate is defined as using the aforementioned definition of a personal computer, such as personal computer system 800 as a machine or tool in conjunction with the aforementioned described room fixture and person characterization generation routine 600 to produce a desired output. Further, computer generated is considered to be an output created with a personal computer by placing objects in a workspace, thus creating a composite work representative of a plurality of similar and dissimilar object. Work done with the use of a personal computer is considered to be computer generated work.

Figure 9:
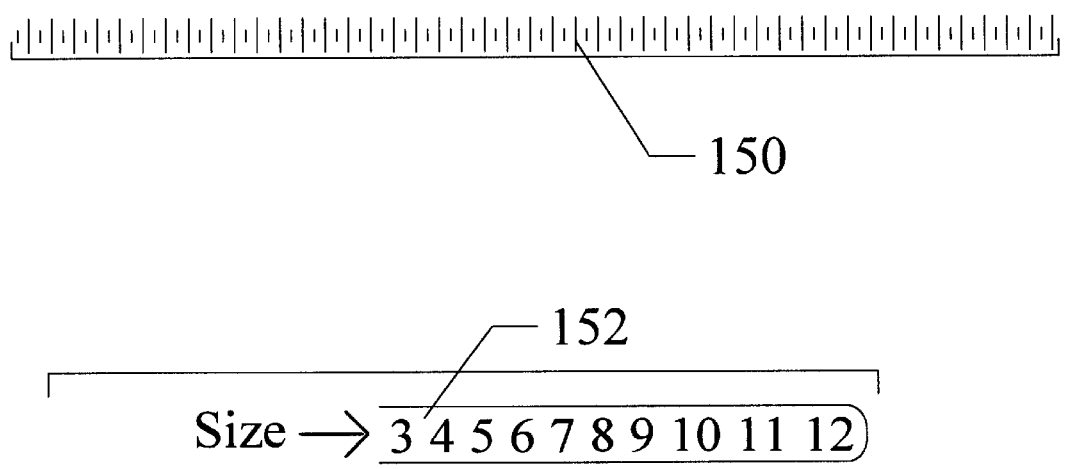
FIG. 9 shows a scale and resize indicator.

There is shown in FIG. 9 a scale 150 and a size indicator 152. In an exemplary embodiment a scale 150 and a size indicator 152 can be used to scale and resize room fixtures, including room floor plan 100, four side shape table 110, oval shape table 112, and round shape table 114.

While particular embodiments of the present invention are disclosed herein, it is not intended to limit the invention to such disclosure, and changes and modifications may be incorporated, and embodied within the scope of the following claims:

What is claimed is:

1. An event planning method for determining the location of event room fixtures and assigning event attendees seating preferences, said event planning method comprising the steps of:

a) adjusting by scaling and resizing selectively the actual size of a room floor plan, wherein said room floor plan is adjusted to be in a ratio proportional to the size of an event room;

b) selecting a plurality of room fixtures for placement on said room floor plan;

c) adjusting by scaling and resizing selectively the size of selected said plurality of room fixtures, wherein said plurality of room fixtures are adjusted to be in a ratio proportional to the actual size of the room fixtures located within said event room;

d) adding selectively descriptive information to selected said plurality of room fixtures;

e) placing said plurality of room fixtures on said room floor plan;

f) selecting a plurality of person characterizations for placement on said room floor plan, each of said plurality of person characterizations represent an event attendee;

g) adding selectively descriptive information to selected said plurality of person characterizations, wherein each of said plurality of person characterizations is rendered individually identifiable; and h) placing said plurality of person characterizations on said room floor plan.

2. The event planning method in accordance with claim 1, further comprising the step of:

a) adding selectively descriptive information to said room floor plan, said plurality of room fixtures, and said plurality of person characterizations.

3. The event planning system in accordance with claim 1, wherein said event attendee is a type of event attendee selected from the group consisting of key people, guests, and special needs guests.

4. The method in accordance with claim 1, further comprises the step of:

fastening said plurality of room fixtures and said plurality of person characterizations to said room floor plan.

5. The method in accordance with claim 4, wherein the fastening of includes with magnets or adhesive strips.

6. The method in accordance with claim 1, wherein said plurality of room fixtures includes a plurality of tables.

7. The method in accordance with claim 6, wherein said plurality of tables is a table type selected from the group consisting of four sided shape tables, oval shape tables, and round shape tables.

8. The method in accordance with claim 1, wherein said plurality of room fixtures is a room fixture type selected from the group consisting of doors, emergency exits, room artifacts, podiums, dance floors, room walls, music area, disc jockey area, place settings, and lighting fixtures.

9. A computer generated event planning method for determining the location or event room fixtures and assigning event attendees seating preferences, said computer generated event planning method comprising the steps of:
  a) creating selectively a first plurality objects;
  b) placing created said first plurality of objects on a room floor plan, said room floor plan represents an event room;
  c) selecting as required a second plurality or objects from a database;
  d) placing selected said second plurality of objects on said room floor plan;
  e) adjusting by scaling and resizing selectively the size of said first plurality of objects and said second plurality of objects; and
  f) adding selectively descriptive information to selected said first plurality of objects and selected said second plurality of objects, wherein at least one of said first plurality of objects or at least one of said second plurality of objects is a plurality of person characterizations, each of said plurality of person characterizations represent an event attendee.

10. The method in accordance with claim 9, wherein said event attendee is a type of event attendee selected from the group consisting of key people, guests, and special needs guests.

11. The method in accordance with claim 9, further comprises the step of:
  fastening said first plurality of objects and said second plurality of objects to said room floor plan.

12. The method in accordance with claim 11, wherein the step of fastening includes magnets or adhesive strips.

13. The method in accordance with claim 9, wherein at least one of said first plurality of objects or at least one of said second plurality of objects is a plurality of tables.

14. The method in accordance with claim 13, wherein said plurality of tables is a table type selected from the group consisting of four sided shape tables, oval shape tables, and round shape tables.

15. The method in accordance with claim 9, wherein at least one of said first plurality of objects or at least one of said second plurality of objects is a plurality of room fixtures.

16. The method in accordance with claim 15, wherein said plurality of room fixtures is a room fixture type selected from the group consisting of doors, emergency exits, room artifacts, podiums, dance floors, room walls, music area, disc jockey area, place settings, and lighting fixtures.

* * * * *